United States Patent
Kitaguchi

(10) Patent No.: US 10,639,578 B2
(45) Date of Patent: May 5, 2020

(54) FILTER EXCHANGE DEVICE, CONTROL METHOD OF FILTER EXCHANGE DEVICE, AND GAS TURBINE EQUIPMENT

(71) Applicant: MITSUBISHI HITACHI POWER SYSTEMS, LTD., Kanagawa-ken (JP)

(72) Inventor: Yoshinori Kitaguchi, Yokohama (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 517 days.

(21) Appl. No.: 15/380,073

(22) Filed: Dec. 15, 2016

(65) Prior Publication Data

US 2017/0182450 A1    Jun. 29, 2017

(30) Foreign Application Priority Data

Dec. 25, 2015    (JP) .................................. 2015-253093

(51) Int. Cl.
*B01D 46/42*    (2006.01)
*B01D 46/00*    (2006.01)

(52) U.S. Cl.
CPC ..... *B01D 46/4227* (2013.01); *B01D 46/0005* (2013.01); *B01D 46/008* (2013.01); *B01D 2279/60* (2013.01)

(58) Field of Classification Search
CPC ............ B01D 46/4227; B01D 46/0005; B01D 46/008; B01D 2279/60; Y10T 29/49718; Y10T 29/49721; Y10T 29/4973
USPC ............................. 29/402.01, 402.03, 402.08
See application file for complete search history.

(56) References Cited

U.S. PATENT DOCUMENTS

| | | | | |
|---|---|---|---|---|
| 3,097,939 A | * | 7/1963 | Basa ................... | B01D 46/0005 55/378 |
| 3,423,908 A | * | 1/1969 | Hart ..................... | B01D 46/002 55/481 |
| 2006/0102006 A1 | * | 5/2006 | Powell ................. | B01D 46/008 96/429 |
| 2006/0180021 A1 | * | 8/2006 | Rodgers ............... | B01D 46/008 95/25 |

(Continued)

FOREIGN PATENT DOCUMENTS

| | | |
|---|---|---|
| JP | 60-100698 | 7/1985 |
| JP | 62-180718 | 8/1987 |

(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

Provided is a filter exchange device attached to a holding frame disposed in a duct and configured to exchange a plurality of filter materials configured to filter a gas flowing through the duct, and the filter exchange device includes an exchange device main body, a moving device configured to move the exchange device main body, and a control device configured to control the exchange device main body and the moving device, wherein the exchange device main body has a casing in which an accommodating space is formed, an exchange mechanism configured to remove a used filter material attached to the holding frame and attach a filter material for exchange accommodated in the casing, and a blocking unit configured to block a gas flowing through the duct from passing through a portion to which the filter material is attached.

10 Claims, 19 Drawing Sheets

(56) References Cited

U.S. PATENT DOCUMENTS

| | | | | |
|---|---|---|---|---|
| 2010/0123312 A1* | 5/2010 | Scott | ................ | F16L 19/07 |
| | | | | 285/386 |
| 2012/0317938 A1* | 12/2012 | Sullivan | ................ | B01D 46/18 |
| | | | | 55/354 |
| 2014/0138323 A1* | 5/2014 | Jones | ................ | E21B 21/065 |
| | | | | 210/739 |
| 2015/0096271 A1* | 4/2015 | Cole | ................ | B01D 46/4227 |
| | | | | 55/385.2 |
| 2015/0101298 A1* | 4/2015 | Osendorf | ........... | B01D 46/2414 |
| | | | | 55/502 |
| 2015/0114229 A1* | 4/2015 | Rout | ................ | B01D 46/008 |
| | | | | 95/286 |
| 2015/0219010 A1* | 8/2015 | Santini | ................ | F01D 25/002 |
| | | | | 60/39.092 |
| 2017/0296960 A1* | 10/2017 | Maas | ................ | B01D 46/0005 |

FOREIGN PATENT DOCUMENTS

| | | |
|---|---|---|
| JP | 64-32199 | 2/1989 |
| JP | 7-253028 | 10/1995 |
| JP | 08-100673 | 4/1996 |
| JP | 08-108024 | 4/1996 |
| JP | 9-60528 | 3/1997 |
| JP | 2008-184982 | 8/2008 |
| JP | 4357765 | 11/2009 |
| JP | 2015-221419 | 12/2015 |
| JP | 2016-168538 | 9/2016 |

\* cited by examiner

FILTER EXCHANGE DEVICE, CONTROL METHOD OF FILTER EXCHANGE DEVICE, AND GAS TURBINE EQUIPMENT

BACKGROUND OF THE INVENTION

Field of the Invention

The present invention relates to a filter exchange device, a control method of the filter exchange device, and gas turbine equipment.

Description of Related Art

A gas turbine includes a compressor configured to suction and compress air, a combustor configured to combust fuel in the compressed air to generate a combustion gas, and a turbine configured to be driven by the combustion gas having a high temperature and high pressure.

When dust is included in the suctioned air, the dust sticks to blades and vanes of the turbine or the compressor, for example, and a fluid resistance is increased. Accordingly, output loss may be increased, and gas turbine output power may be decreased as a result.

For this reason, the gas turbine includes a filter device configured to remove the dust included in atmosphere. Such a filter device is constituted by one filter material or by assembling a plurality of filter materials.

When the gas turbine is operated, since suction performance is deteriorated when clogging of such a filter material or the like occurs, it is essential to perform periodic cleaning or replacement work.

As a structure configured for exchange of the filter material to be smoothly performed, for example, a technology disclosed in Patent Document 1 is known. In the technology disclosed in Patent Document 1, an example of achieving improvement of workability and reduction in working time by installing a folding type roller conveyor in a suction filter chamber (duct) is disclosed.

PRIOR ART DOCUMENT

Patent Document

Patent Document 1: Japanese Patent Application, First Publication No. H09-60528

SUMMARY OF THE INVENTION

However, in the technology disclosed in Patent Document 1, while workability has been improved, work by a worker is still necessary. In addition, the gas turbine need be stopped for such work.

The present invention is directed to providing a filter exchange device that enables conveniently performing exchange of a filter material even when a gas turbine is in operation, a control method of the filter exchange device, and gas turbine equipment.

According to a first aspect of the present invention, there is provided a filter exchange device attached to a holding frame disposed in a duct and configured to exchange a plurality of filter materials configured to filter a gas flowing through the duct, the filter exchange device including: an exchange device main body; a moving device configured to move the exchange device main body; and a control device configured to control the exchange device main body and the moving device, wherein the exchange device main body has: a casing in which an accommodating space is formed; an exchange mechanism configured to remove the used filter material attached to the holding frame and attach the filter material for exchange accommodated in the casing; and a blocking unit configured to block a gas flowing through the duct from passing through a portion to which a filter material is attached.

According to the above-described configuration, even when exchange of the filter material is performed while a gas flows through the duct, foreign substances can be suppressed from passing through the filter device.

In addition, as the control device controls the moving device and the exchange mechanism, the filter material can be automatically exchanged. Accordingly, exchange of the filter material can be conveniently performed.

In the above-described filter exchange device, the casing may have an opening section configured to bring the accommodating space in communication with the outside, and the blocking unit may have a louver configured to block the opening section.

In the above-described filter exchange device, the blocking unit may have a movable hood configured to be movable between a sealing position at which the movable hood comes in contact with the holding frame and closes a gap between the casing and the holding frame, and a separated position separated from the holding frame.

According to the above-described configuration, when exchange of the filter material is performed during an operation of the filter device, as the movable hood is extended while the louver is put in a closed state, foreign substances can be suppressed from passing through the filter device. In addition, when the exchange is not performed, as the louver is put in an open state, passage of the gas through the casing can be allowed.

In the above-described filter exchange device, the exchange mechanism may have an arm configured to grip the filter material, and an arm moving mechanism configured to move the arm.

In the above-described filter exchange device, a filter material discharge mechanism configured to discharge a used filter material removed by the exchange mechanism from the casing, and a conveyor configured to unload the used filter material, discharged from the casing by the filter material discharge mechanism, to the outside of the duct may be provided.

According to the above-described configuration, the removed filter material can be rapidly unloaded to the outside of the duct.

In the above-described filter exchange device, the plurality of filter materials may be attached to the holding frame as a plurality of filter material units in each of which a plurality of the filter materials are fixed to a filter material frame having a plate shape; the casing may be able to accommodate the filter material unit to which the used filter material is fixed and the filter material unit to which the filter material for exchange is fixed; the exchange mechanism may have a rotary shaft installed at the casing, a rotary shaft driving device configured to rotatably drive the rotary shaft, a first mounting section and a second mounting section installed at positions symmetrical with respect to the rotary shaft, the first mounting section being a section on which one of the used filter material unit and the filter material unit for exchange is mounted, the second mounting section being a section on which the other one of the used filter material unit and the filter material unit for exchange is mounted, and arms installed at the first mounting section and the second mounting section, and configured to remove the filter material unit attached to the duct and attach the filter material unit accommodated in the casing to the duct; and the first mounting section and the second mounting section may be configured to exchange positions according to rotation of the rotary shaft.

According to the above-described configuration, as the configuration for gripping the plurality of filter materials together is provided, the filter materials can be exchanged more quickly. In addition, as the configuration is provided in which the exchange mechanism has the first mounting section and the second mounting section and the filter material units mounted thereon are replaced, the filter material can be exchanged more quickly.

In the above-described filter exchange device, the filter material frame may have an engaging section configured to be engaged with a fixing hook formed at the holding frame.

According to the above-described configuration, the filter material unit can be easily disposed in the duct.

In the above-described filter exchange device, the moving device may have a traveling mechanism having wheels installed under the exchange device main body and a wheel driving device configured to drive the wheels.

According to the above-described configuration, even when the plurality of filter materials are installed in a horizontal direction, the plurality of filter materials can be exchanged by traveling the exchange device.

In the above-described filter exchange device, the moving device may have a placing section configured to support the exchange device main body and a placing section driving device configured to move the placing section in an upward-downward direction.

According to the above-described configuration, even when a plurality of stories are provided in the duct, the filter materials on all of the stories can be exchanged.

According to a second aspect of the present invention, there is provided a control method of any one of the above-described filter exchange devices, the control method including: an exchange device moving step of controlling the moving device and moving the exchange device main body to a position of a filter material of an exchange target; a blocking step of controlling the blocking unit and blocking a gas flowing through a duct from passing through a portion to which a filter material is attached; a filter material removing step of controlling the exchange mechanism and removing a used filter material; and a filter material attaching step of controlling an exchange mechanism and attaching a filter material for exchange to a holding frame.

According to a third aspect of the present invention, gas turbine equipment includes: a gas turbine including a suction duct; a filter device installed upstream from the suction duct; and any one of the above-described filter exchange devices.

According to the present invention, even when exchange of the filter material is performed while a gas flows through the duct, foreign substances can be suppressed from passing through the filter device.

In addition, as the control device controls the moving device and the exchange mechanism, the filter material can be automatically exchanged. Accordingly, exchange of the filter material can be conveniently performed.

DETAILED DESCRIPTION OF THE INVENTION

First Embodiment

Hereinafter, a filter device having a filter exchange device of a first embodiment of the present invention will be described in detail with reference to the accompanying drawings. The filter device of the embodiment is installed at gas turbine equipment including a gas turbine. The filter exchange device is a device configured to automatically exchange filter materials (filter elements, see FIG. 2) used in the filter device.

Further, the filter device of the present invention can be applied not only to gas turbine equipment but also to any equipment in which suction and discharge of a gas is necessary. For example, the filter device of the present invention can be applied to diesel power generation equipment that suctions air in the same way as the gas turbine equipment. In addition, the filter device may be installed at an exhaust path of atomic power generation equipment to perform filtering of exhausted gas.

Figure 1:
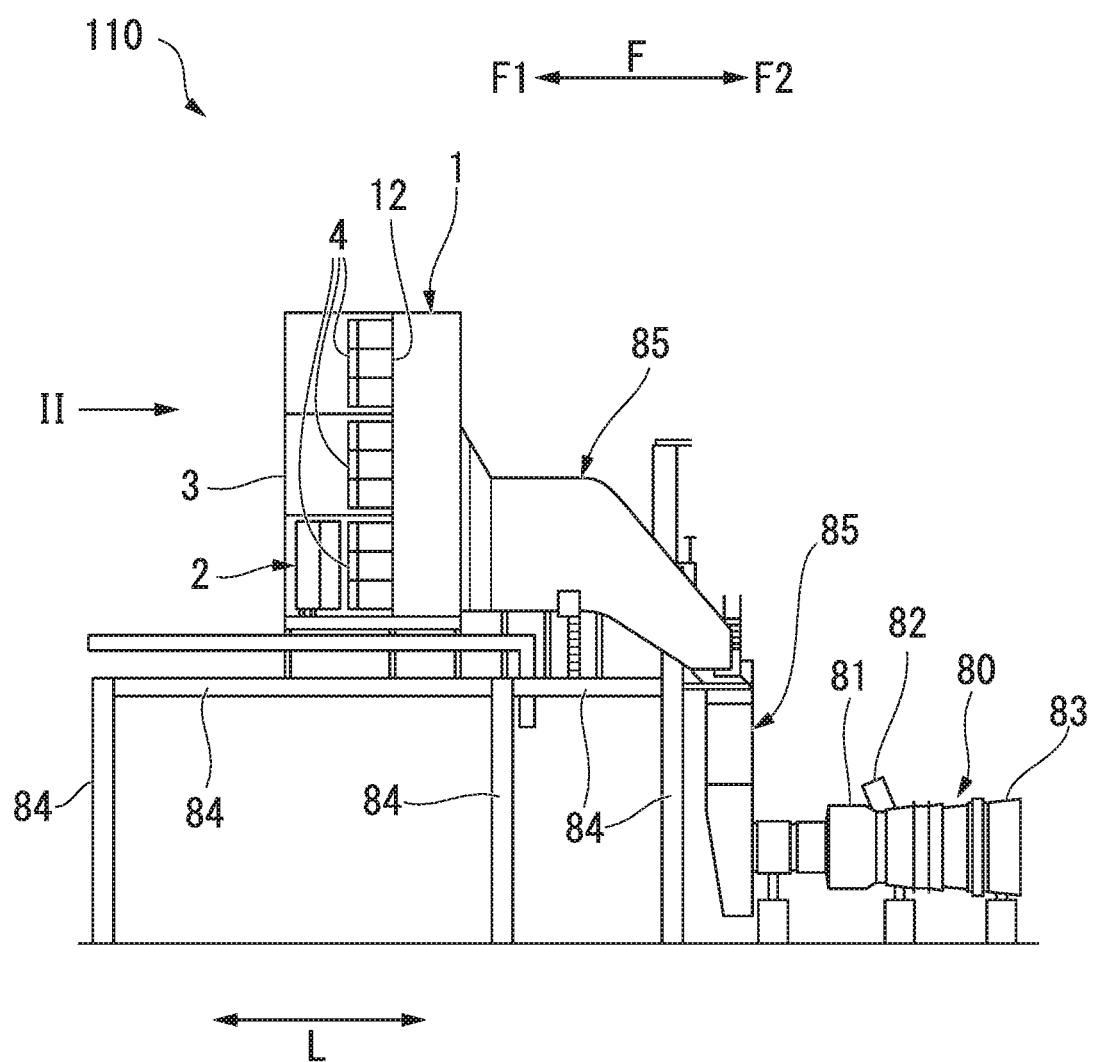
FIG. 1 is a side view of a gas turbine including a filter exchange device of a first embodiment of the present invention.

As shown in FIG. 1, gas turbine equipment 110 includes a filter device 1 configured to filter a gas (air) supplied into a gas turbine 80.

The gas turbine 80 includes a compressor 81 configured to suction and compress the gas, a combustor 82 configured to combust fuel in the compressed gas to generate a combustion gas, and a turbine 83 configured to be driven by the combustion gas having a high temperature and high pressure. The filter device 1 removes foreign substances from a gas serving as a working fluid and supplies the gas into the compressor 81.

The filter device 1 includes a suction filter chamber (hereinafter referred to as a duct 3) configured to form a suction flow path (a duct), a support structure 84 configured to support the duct 3 at a position separated upward from the surface of the earth, and a plurality of filter materials 5 (filter elements). The filter materials 5 are held in a wall frame 12 installed at the duct 3.

In the embodiment, the duct 3 is constructed as a three-story building. That is, a first story portion is installed just above the support structure 84, and a second story portion and a third story portion are installed thereupon in sequence. However, the three-story building of the duct 3 is an example, and the filter device 1 may be placed on the ground or have any number of stories.

Filter assemblies 4 are disposed in each story of the duct 3. The filter device 1 and the compressor 81 are connected to each other by a suction duct 85. Accordingly, the gas flowing through the filter assembly 4 installed in the duct 3 flows through the suction duct 85 to be supplied into the gas turbine 80.

In the following description, an upstream side of the gas is simply referred to as an upstream side F1, and a downstream side of the gas is simply referred to as a downstream side F2. A direction following the gas flow is referred to as a flow direction F.

Figure 2:
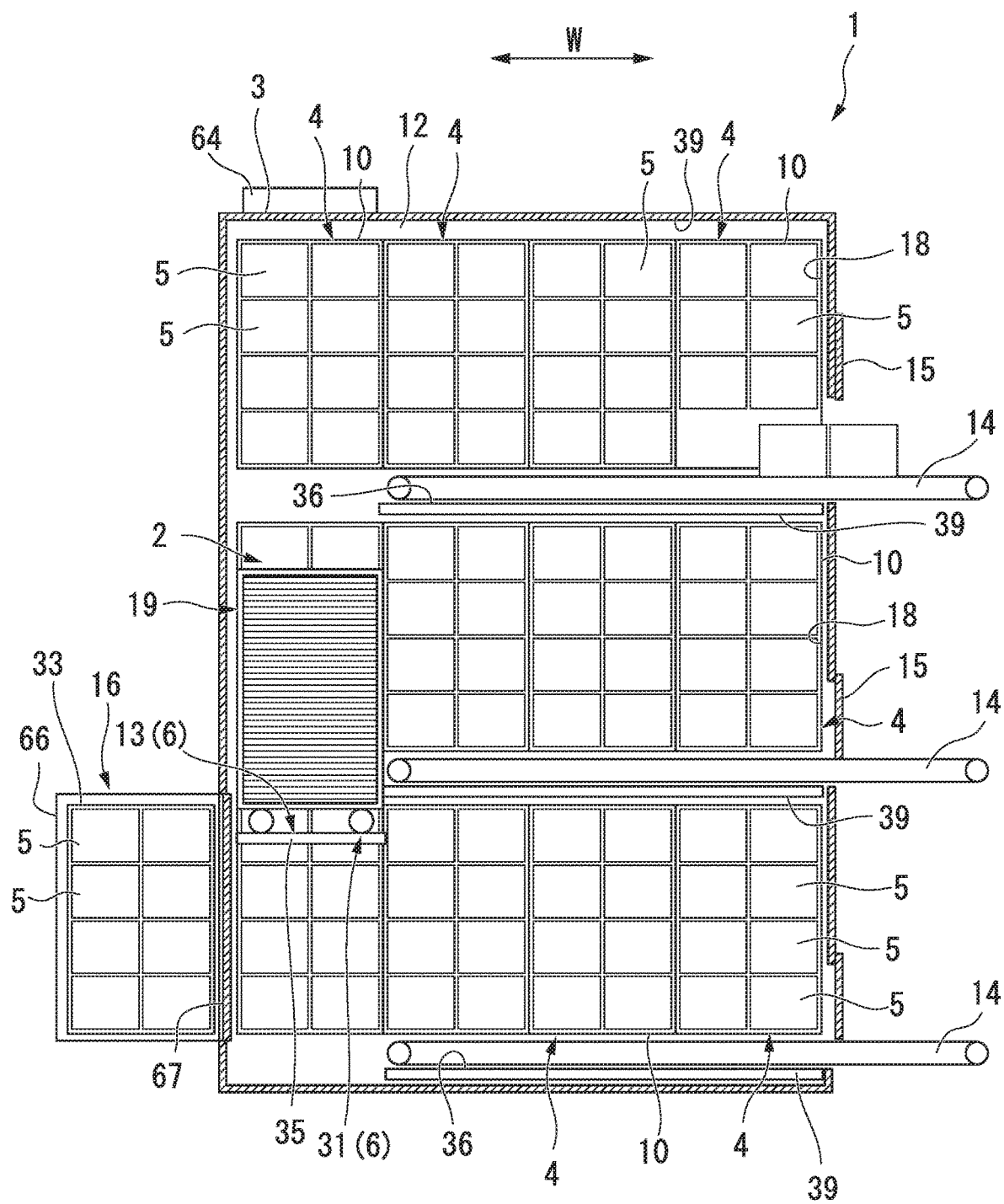
FIG. 2 is a front view of a filter device and the filter exchange device of the first embodiment of the present invention, when seen as indicated by an arrow II of FIG. 1.

As shown in FIG. 2, the filter device 1 has the duct 3 configured to form a suction flow path having a rectangular shape in the cross section, the wall frame 12 installed in the duct 3 and serving as a plate-shaped member perpendicular to the flow direction F, and the plurality of filter assemblies 4 held in the wall frame 12. The filter assembly 4 is held in an assembly holding hole 18 formed in the wall frame 12.

The filter assembly 4 installed on each story has the plurality of filter materials 5 configured to filter foreign substances from the suctioned gas, and a frame body 10 configured to support the filter materials 5. That is, the filter materials 5 are held in the wall frame 12 via the frame body 10. In other words, the plurality of filter materials 5 are held by a holding frame constituted by the frame body 10 and the wall frame 12.

Figure 3:
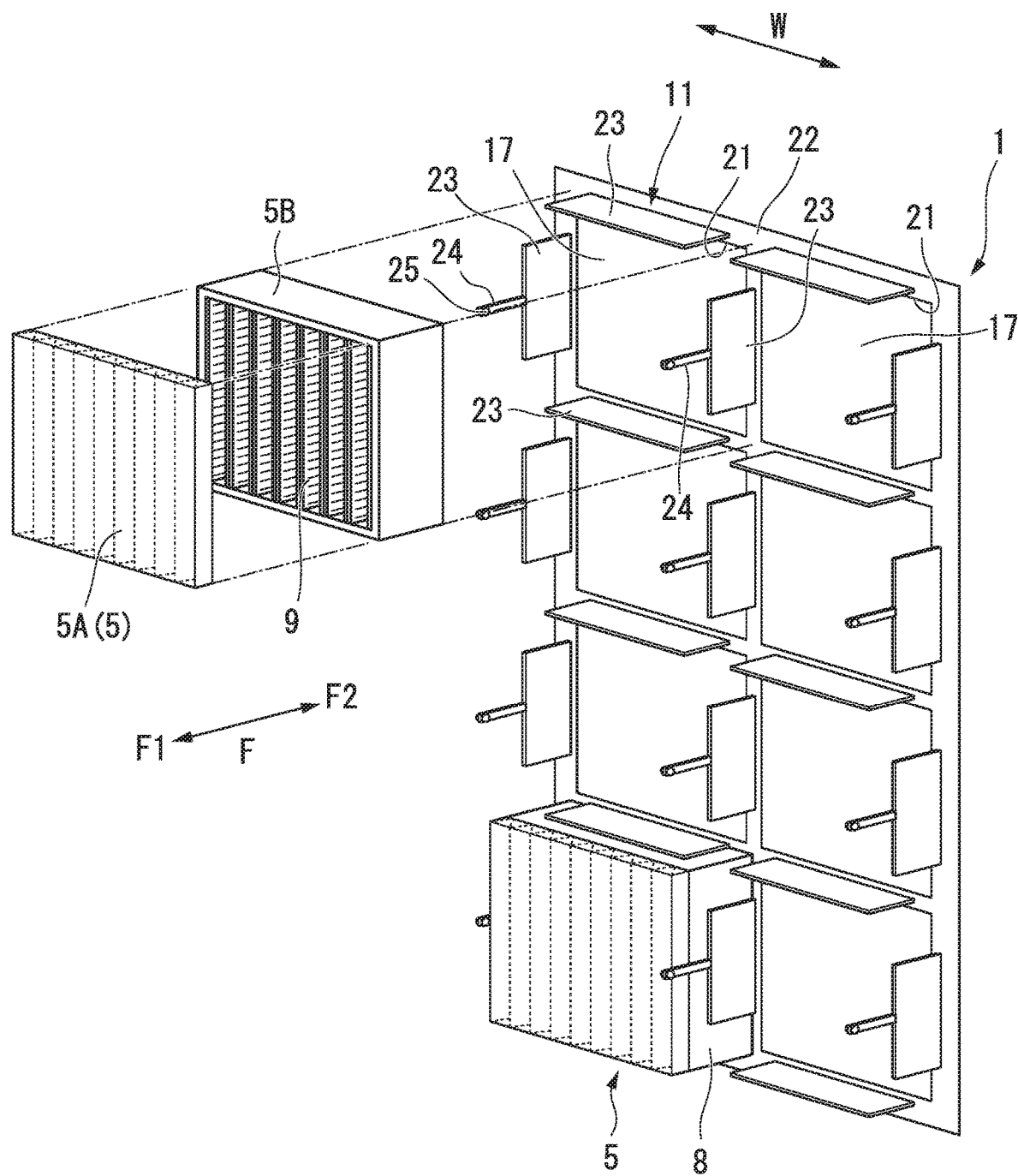
FIG. 3 is a perspective view of a filter assembly of the filter device of the first embodiment of the present invention.
Figure 4:
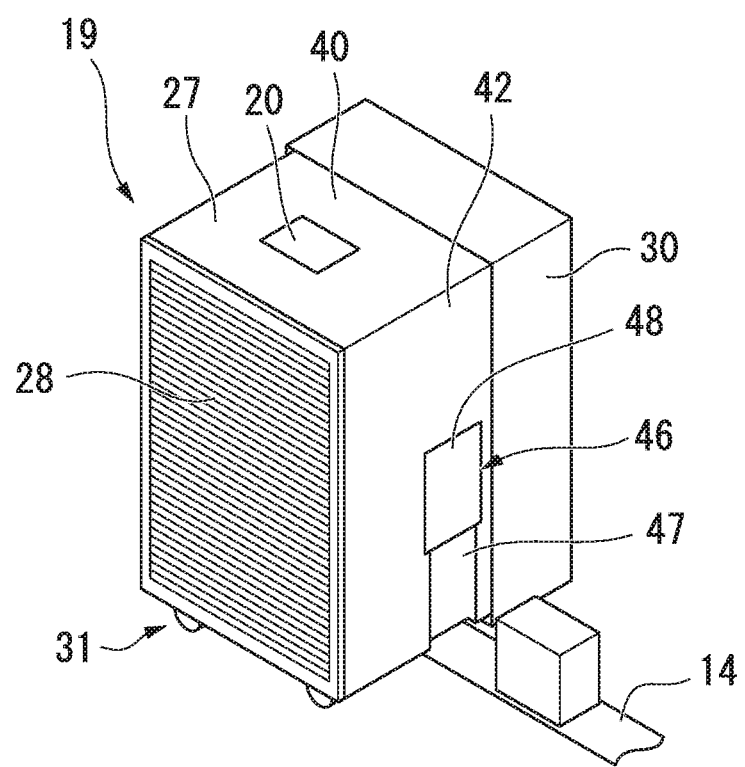
FIG. 4 is a perspective view of an exchange device main body of the filter exchange device of the first embodiment of the present invention.

As shown in FIG. 3, the filter materials 5 are attached to the frame body 10 by fixing members 11 installed on the frame body 10.

The filter materials 5 each form a cube shape and have a pre-filter material 5A installed at the upstream side F1 of the frame body 10 and configured to filter out dust having a large particle diameter from the suctioned gas, and a main filter material 5B installed to come in contact with a surface at the downstream side F2 of the pre-filter material 5A and configured to filter out dust having a relatively small particle diameter. The filter materials 5 are formed of non-woven fabrics or the like having a thin fiber diameter, and also referred to as a panel filter. The filter material 5 is formed by connecting the pre-filter material 5A and the main filter material 5B in series, and outer surfaces of the filter except for those at the upstream side F1 and the downstream side F2 are surrounded by a filter casing 8.

Members formed in corrugated plate shapes are mainly used as the pre-filter materials 5A. A surface at the upstream side F1 and a surface at the downstream side F2 of the pre-filter material 5A communicate with each other such that a gas flows therethrough, and filter media formed of non-woven fabrics or the like that can capture dust are disposed therebetween.

The main filter material 5B is the filter material 5 fixed to the surface at the downstream side F2 of the pre-filter material 5A. In the main filter material 5B, like the pre-filter material 5A, a surface at the upstream side F1 and a surface at the downstream side F2 communicate with each other such that a gas flows therethrough. Filter media 9 are disposed in the main filter materials 5B. A thickness dimension in the flow direction F of the main filter materials 5B is larger than a thickness dimension of the pre-filter materials 5A. The main filter materials 5B are members configured to capture dust or the like having a relatively small particle diameter that was not captured by the pre-filter materials 5A. Accordingly, non-woven fabrics or the like of high particle collection efficiency having a smaller fiber diameter than that of filter media provided in the pre-filter materials 5A are used as the filter media 9 provided in the main filter materials 5B.

In addition, a so-called high efficiency particulate (HEPA) filter or a semi HEPA filter is preferably used as the main filter materials 5B.

The frame body 10 has a frame body main body 22 having a plate shape, and the fixing members 11 fixed to the frame body main body 22 and configured to retain the filter materials 5 to prevent them from falling onto a floor surface.

The frame body 10 has a plurality of filter material holding sections 17 configured to hold the filter materials 5. Frame body flow holes 21 each having a rectangular shape are formed in the frame body main body 22 to correspond to the filter material holding sections 17.

The fixing members 11 abut circumferential edge portions of the filter materials 5 to prevent the filter materials 5 from dropping from the filter material holding sections 17 to the upstream side F1. The fixing members 11 include partition plates 23 disposed between the filter material holding sections 17, and hook members 24 fixed to the partition plates 23. The partition plates 23 each have a plate shape and are disposed to abut four outer surfaces of the filter casing 8 of the filter material 5 disposed in the filter material holding section 17.

The hook members 24 are attached to those partition plates 23 of the partition plates 23 that abut side surfaces of the filter casing 8. The hook member 24 is a member retaining so as to hold the filter materials 5 accommodated in the filter material holding sections 17. A convex portion 25 is formed at a distal end portion of the hook member 24.

The filter materials 5 are inserted into the filter material holding sections 17 from the upstream side F1. Further, the filter materials 5 accommodated in the filter material holding sections 17 are held by the fixing members 11 constituted by the partition plates 23 and the hook members 24. While the filter materials 5 are pressed against the downstream side F2 by a flow of the gas during an operation, when there is no flow of the gas, the filter materials 5 can be easily removed by being pulled to the upstream side F1.

The frame body 10 is configured such that the four filter materials 5 are held in an upward-downward direction and the two filter materials 5 are held in a widthwise direction W crossing the upward-downward direction. However, the number of the above-mentioned filter materials 5 attached is an example, and the number is not limited to this number.

Next, a filter exchange device 2 used when the filter materials 5 are exchanged will be described in detail. The filter exchange device 2 is a device configured to exchange the used filter materials 5 with filter materials 5 for exchange serving as new filter materials 5.

As shown in FIG. 2, the filter exchange device 2 has an exchange device main body 19, a moving device 6 configured to move the exchange device main body 19, an unloading conveyor 14 installed on each floor of the duct 3, a filter chamber unloading door 15 configured to unload the used filter materials 5, unloaded by the unloading conveyor 14, to the outside of the duct 3, and a filter material filling device 16 installed in the vicinity of the duct 3.

The moving device 6 has a traveling mechanism 31 installed at the exchange device main body 19, and an elevation mechanism 13 configured to move the exchange device main body 19 inside the duct 3 in the upward-downward direction.

The filter exchange device 2 includes a filter material holding frame 33 that can hold the plurality of filter materials 5. The filter material holding frame 33 is used when the filter materials 5 for exchange are accommodated in the exchange device main body 19.

However, the traveling mechanism 31 may not be installed at the exchange device main body 19 but may be, for example, an external handling mechanism such as a stacker crane.

As shown in FIG. 4 to FIG. 7, the exchange device main body 19 has a casing 27 having an accommodating space 26 that can accommodate the plurality of filter materials 5, a louver 28 attached to the casing 27, an exchange mechanism 29 (see FIG. 5) configured to perform gripping and conveyance of the filter materials 5, a movable hood 30 configured to prevent the gas from flowing from the frame body flow hole 21 of the frame body 10 to the downstream side F2 during exchange of the filter materials 5, a filter material discharge mechanism 32 (see FIG. 6) configured to unload the filter materials 5 from the exchange device main body 19, and a control device 20.

The elevation mechanism 13 is a mechanism configured to elevate the exchange device main body 19 in the upward-downward direction of the duct 3. The elevation mechanism 13 has a placing section 35 that can support the exchange device main body 19, and a placing section driving device 64 configured to move the placing section 35 in the upward-downward direction.

The unloading conveyor 14 is installed at a floor section 36 of each floor of the duct 3. The unloading conveyor 14 is a belt conveyor disposed to move the filter materials 5 on the floor section 36 in the widthwise direction W of the duct 3 (a horizontal direction perpendicular to the flow direction F).

The filter chamber unloading door 15 is a door installed at each floor of the duct 3 and configured to unload the filter materials 5 conveyed by the unloading conveyor 14 to the outside of the duct 3.

Figure 8:
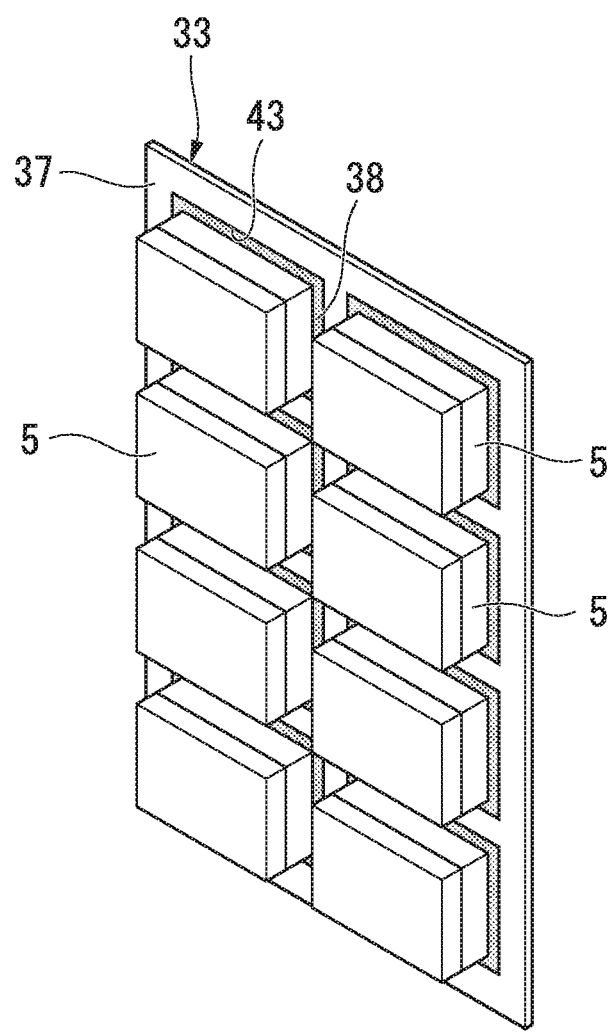
FIG. 8 is a perspective view of a filter material unit of the first embodiment of the present invention.

As shown in FIG. 8, the filter material holding frame 33 is configured to hold the four filter materials 5 in the upward-downward direction and the two filter materials 5 in the widthwise direction crossing the upward-downward direction, like the frame body 10 attached to the wall frame 12.

The filter material holding frame 33 has a plate-shaped frame 37 in which a plurality of frame through-holes 43 are formed, and an elastic member 38 attached to the frame through-holes 43. The frame through-holes 43 are rectangular holes that are slightly larger than outer shapes of the filter materials 5. The elastic member 38 is attached to rectangular edge portions of the frame through-holes 43.

The elastic member 38 is installed throughout inner circumferences of the frame through-holes 43. The filter material holding frame 33 is configured such that the filter materials 5 are held therein by pushing the filter materials 5 into the frame through-holes 43 using a predetermined force. The filter materials 5 held in the frame through-holes 43 can be removed from the filter material holding frame 33 by pulling the filter materials using a predetermined force.

The casing 27 has a shape in which four rectangular plates are assembled in a square frame shape such that main surfaces of the plates are parallel to the flow direction F. In other words, the casing 27 has a rectangular tubular shape in which a pair of opening sections 34 are disposed to face the flow direction F. The casing 27 functions as a duct configured to cause the gas introduced from the upstream side F1 in the flow direction to flow to the downstream side F2.

The casing 27 has an upper wall section 40, a lower wall section 41, and a pair of sidewall sections 42. An interval between the upper wall section 40 and the lower wall section 41 is smaller than an interval between a ceiling section 39 and the floor section 36 of the floor. The interval between the upper wall section 40 and the lower wall section 41 is slightly larger than a height of the four filter materials 5 attached to the filter assembly 4 and arranged in the upward-downward direction. The interval of the pair of sidewall sections 42 is slightly larger than a width of the two filter materials 5 attached to the filter assembly 4 and neighboring in a lateral direction.

The louver 28 covers one of the opening sections 34 of the casing 27 so as to open and close the opening section 34. The louver 28 has a plurality of vanes 44, a louver frame 45 configured to hold the plurality of vanes 44 so as to open and close the vanes 44, and an electric motor (not shown)

configured to modify angles of the plurality of vanes 44. The louver 28 allows a flow of the gas by arranging the angles of the plurality of vanes 44 substantially horizontally. The louver 28 blocks the flow of the gas by arranging the angles of the plurality of vanes 44 substantially vertically.

When the louver 28 is in a closed state, an opening section 34A at the upstream side F1 of the casing 27 is closed. That is, when the louver 28 is in the closed state, the gas introduced from the upstream side F1 is not introduced from the opening section 34A at the upstream side F1 of the casing 27.

A filter material unloading door 46 configured to unload the used filter materials 5 is installed at the casing 27. The filter material unloading door 46 is installed at a lower part of one of the sidewall sections 42 of the casing 27. The filter material unloading door 46 has an unloading door opening section 47 formed to have a size such that the filter materials 5 can be unloaded, an unloading door main body section 48 configured to open and close the unloading door opening section 47, and an unloading door moving mechanism section (not shown) configured to move the unloading door main body section 48.

The unloading door main body section 48 has a plate shape and is attached to the sidewall sections 42 of the casing 27 slidably in the upward-downward direction.

The unloading door moving mechanism has an electric motor and a rack-and-pinion mechanism. The rack is fixed to the unloading door main body section 48 such that a longitudinal direction of the rack is along the upward-downward direction.

The pinion is attached to an output shaft of the electric motor. The electric motor is fixed to a predetermined position of the sidewall section 42 such that the pinion and the rack are meshed with each other.

The movable hood 30 is movable between a sealing position at which the movable hood 30 comes in contact with the holding frame constituted by the frame body 10 and the wall frame 12 and closes a gap between the casing 27 and the holding frame, and a separated position separated from the holding frame.

The movable hood 30 is installed at the downstream side F2 of the casing 27 and combined with the casing 27 to be telescopically extended and contracted. The end portion at the downstream side F2 of the movable hood 30 abuts a planar portion of the frame body 10 when the movable hood 30 moves downstream.

The movable hood 30 has a hood main body section 49 formed to be slightly larger than the casing 27 when seen in the flow direction F, a hood moving device (not shown) configured to move the hood main body section 49 in the flow direction F, a first seal member 50 configured to seal a space between the hood main body section 49 and the casing 27, and a second seal member 51 configured to seal a space between the hood main body section 49 and the frame body 10 when the movable hood 30 is moved to the downstream side F2.

The casing 27 and the hood main body section 49 each form a rectangular tubular shape and are telescopically combined with each other. The hood main body section 49 functions as a blocking unit configured to block the gas introduced from the upstream side F1 in the flow direction together with the louver 28 and the casing 27.

Figure 5:
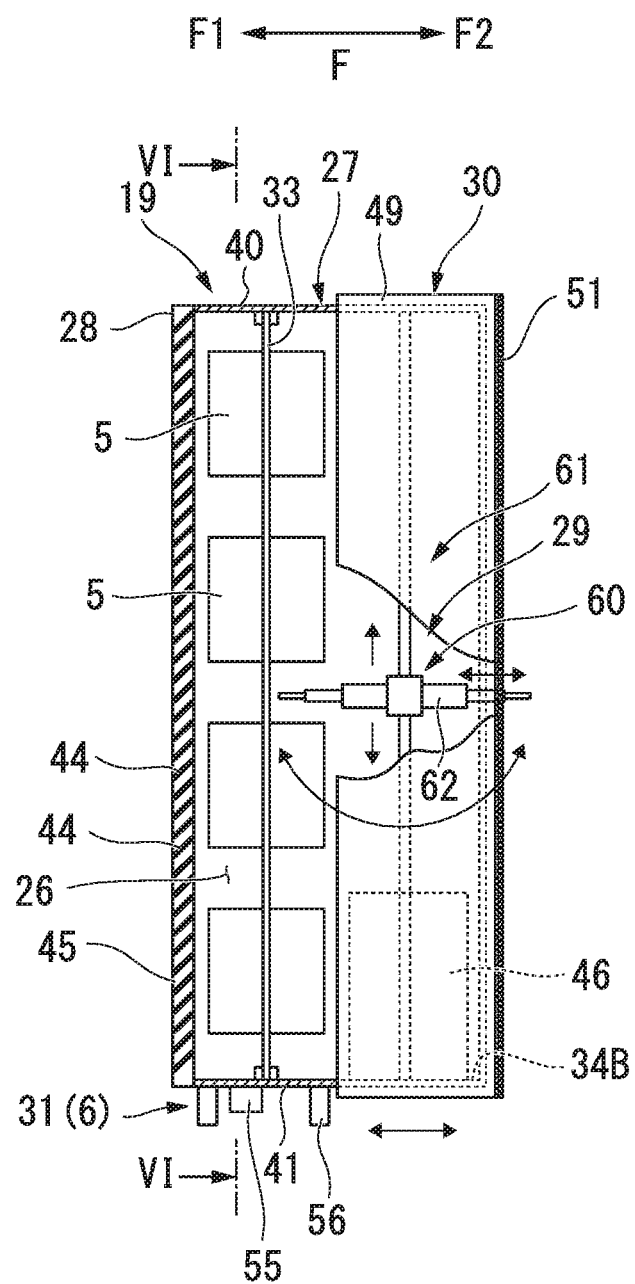
FIG. 5 is a side view showing a partial cross section of the exchange device main body of the filter exchange device of the first embodiment of the present invention.
Figure 9:
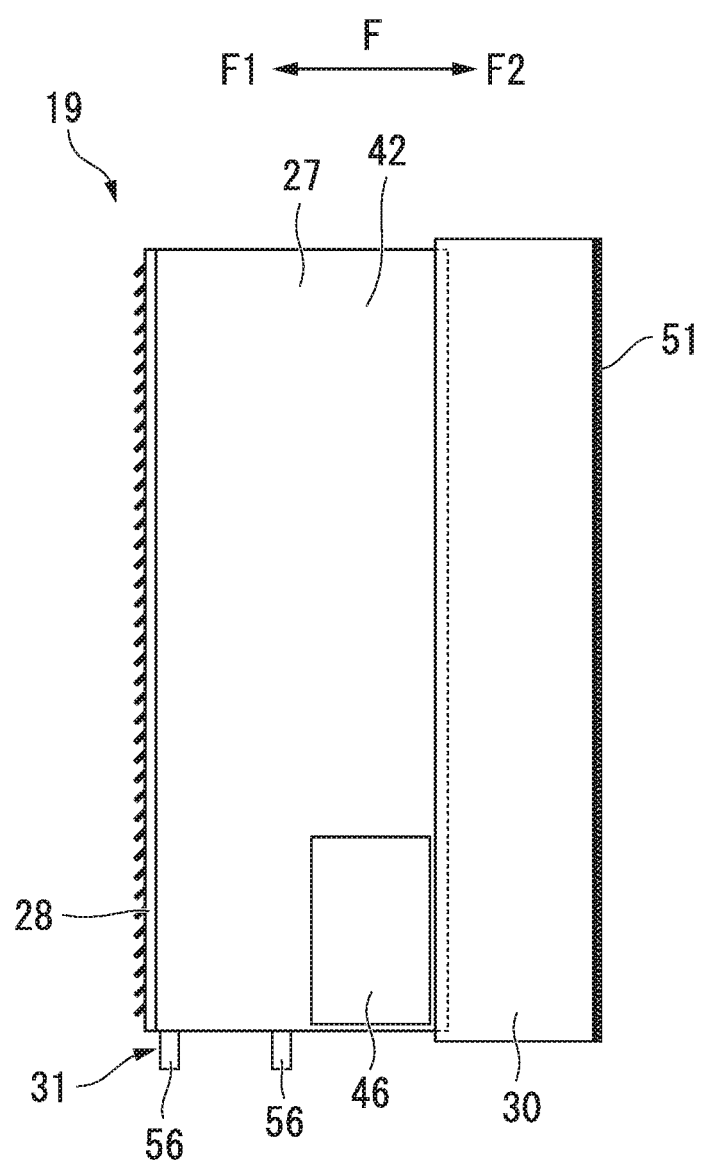
FIG. 9 is a side view of a state in which a movable hood of the exchange device main body of the filter exchange device of the first embodiment of the present invention is extended.

The hood main body section 49 of the movable hood 30 can overlap the casing 27 as shown in FIG. 5, or can be moved to the downstream side F2 in the flow direction F as shown in FIG. 9. While the movable hood 30 is moving, a space between the hood main body section 49 and the casing 27 is sealed by the first seal member 50.

The hood main body section 49 has a rectangular tubular shape like the casing 27, and has a hood upper wall section 52, a hood lower wall section 53, and hood sidewall sections 54. The hood main body section 49 is formed such that a gap between the hood upper wall section 52 and the upper wall section 40 of the casing 27, a gap between the hood lower wall section 53 and the lower wall section 41 of the casing 27, and a gap between the hood sidewall sections 54 and the sidewall sections 42 of the casing 27 are sealed by the first seal member 50.

The first seal member 50 is attached to the inner wall surface of the end portion at the upstream side F1 in the flow direction of the hood main body section 49 throughout the circumference of the inner wall surface. The first seal member 50 seals a space between the outer wall surface of the casing 27 and the inner wall surface of the hood main body section 49. The second seal member 51 is attached to the edge portion at the downstream side F2 in the flow direction of the hood main body section 49 throughout the circumference.

The hood moving device may be constituted by an electric motor, a rack-and-pinion mechanism, and so on.

The traveling mechanism 31 has four tires 56 (wheels) attached to four corners of the lower wall section 41 of the casing 27, and a wheel driving device 55 (an electric motor) configured to drive the tires 56. The tires 56 are directed such that the casing 27 is movable in the widthwise direction W of the floor. The wheel driving device 55 drives at least one of the four tires 56. The wheel driving device 55 is fixed to a predetermined position of the casing 27.

The exchange mechanism 29 has a pair of arms 62 configured to grip the filter materials 5, and an arm moving mechanism 61 configured to move the pair of arms 62.

The arms 62 are vertically and horizontally movable inside the casing 27 by the arm moving mechanism 61. In addition, the arms 62 can be inserted and extracted between the partition plates 23 and the filter material 5.

The arm moving mechanism 61 has a pair of upper-lower shafts 57 extending in the upward-downward direction, upper-lower moving sections 59 vertically movably attached to the upper-lower shafts 57, a horizontal shaft 58 configured to connect the upper-lower moving sections 59, and a horizontal moving section 60 that can travel on the horizontal shaft 58.

The pair of upper-lower shafts 57 each form a rod shape extending in the upward-downward direction and are fixed to the casing 27 to connect the upper wall section 40 and the lower wall section 41. The exchange mechanism 29 has an electric motor configured to generate a driving force to move the upper-lower moving sections 59 in the upward-downward direction, and an electric motor configured to generate a driving force to move the horizontal moving section 60 in a horizontal direction. Movement of the upper-lower moving sections 59 and movement of the horizontal moving section 60 may be performed by, for example, a ball-screw mechanism.

The pair of arms 62 are attached to both ends of the horizontal moving section 60. The pair of arms 62 are extendible and contractable and rotatable. The pair of arms 62 are configured to grip the filter material 5 with distal ends of the arms 62 inserted between the filter material 5 held in the frame body 10 and the fixing member 11 of the frame body 10.

The arms 62 are attached to an output shaft of a servo-motor or a stepping motor installed at the horizontal moving section 60. The arms 62 are movable about the horizontal shaft 58 on a plane perpendicular to the horizontal shaft 58. The arms 62 have a built-in pneumatic cylinder and can be extended and contracted in a longitudinal direction. A rubber member 63 (see FIG. 14) capable of holding the filter materials 5 is attached to the distal ends of the arms 62.

Figure 6:
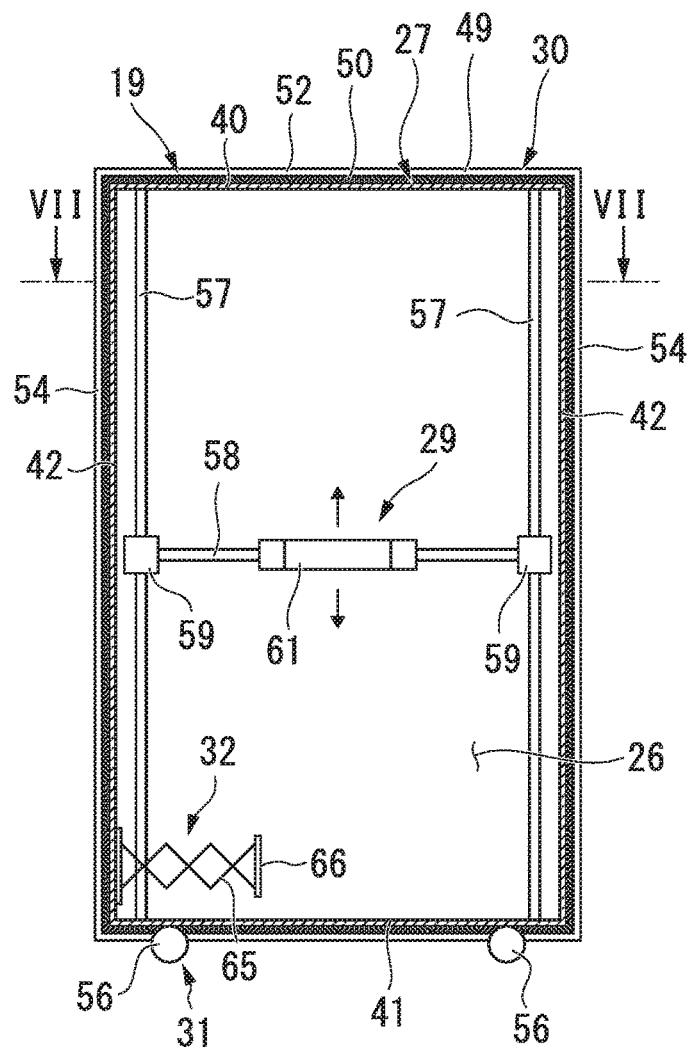
FIG. 6 is a front view of the exchange device main body of the filter exchange device of the first embodiment of the present invention, when seen as indicated by an arrow VI-VI of FIG. 5.
Figure 7:
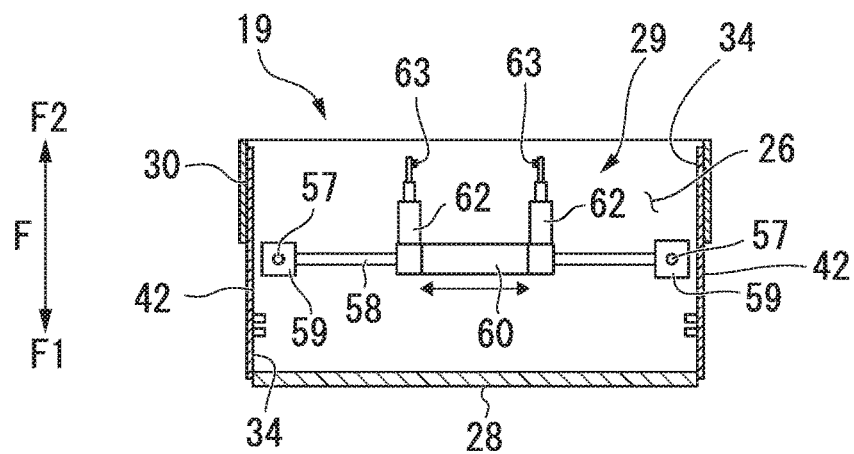
FIG. 7 is a plan view of the exchange device main body of the filter exchange device of the first embodiment of the present invention, when seen as indicated by an arrow VII-VII of FIG. 6.

As shown in FIG. 6, the filter material discharge mechanism 32 is installed in a bottom part of the casing 27. The filter material discharge mechanism 32 is a device configured to push out the filter materials 5 disposed in the bottom part of the casing 27 (an upper surface of the lower wall section 41). The filter material discharge mechanism 32 has a telescopic arm 65 that is extendible and contractible, and an electric motor (not shown) configured to drive the telescopic arm 65. The telescopic arm 65 may employ a configuration in which a pair of link members are connected at a central portion thereof and a plurality of pairs of link members are connected at end portions thereof, or may employ a pneumatic cylinder, or the like.

The configuration of the telescopic arm 65 is not limited to the above-mentioned configuration, but it is preferable that the telescopic arm 65 be sufficiently compact in a contracted state and can push out the filter materials 5 disposed at a bottom part of the casing 27 in the extended state.

As shown in FIG. 2, the filter material filling device 16 is disposed in the vicinity of the duct 3 (the suction filter chamber).

The filter material filling device 16 includes a housing 66 configured to accommodate the filter material holding frame 33 in which the plurality of filter materials 5 are held, and a conveyance device (not shown) configured to convey the filter material holding frame 33 accommodated in the housing 66. An isolation door 67 configured to introduce the filter material holding frame 33 conveyed from the filter material filling device 16 is installed at the duct 3.

The housing 66 of the filter material filling device 16 has a box shape configured to accommodate the filter material holding frame 33 in a state in which the plurality of filter materials 5 are held therein. Of outer walls of the housing 66, an outer wall facing the duct 3 is opened and connected to the isolation door 67. That is, when the isolation door 67 is put in the open state, the inside of the housing 66 comes in communication with the inside of the duct 3.

The filter material filling device 16 is installed at a side of the elevation mechanism 13 of the first story portion of the duct 3. That is, the filter material filling device 16 is disposed at a position from which it can approach the exchange device main body 19 placed on the placing section 35 of the elevation mechanism 13 and disposed at the first story portion. An intake door (not shown) configured for the filter material holding frame 33 to be inserted and removed in the state in which the filter materials 5 are held therein is installed at the housing 66.

The conveyance device is a device configured to convey the filter material holding frame 33 in which the filter materials 5 are held. For example, the conveyance device may be constituted by a plurality of rollers rotatably installed at the lower surface of the housing 66, and an electric motor configured to drive the rollers. Extendible and contractible arms may be used as the conveyance device, as in the filter material discharge mechanism 32.

Next, a control method of the filter exchange device 2 of the embodiment will be described.

In the following description, the case in which the used filter materials 5 attached to the second filter assembly 4 from a right side when seen from the upstream side F1 of the third story portion of the duct 3 are exchanged will be described.

Figure 10:
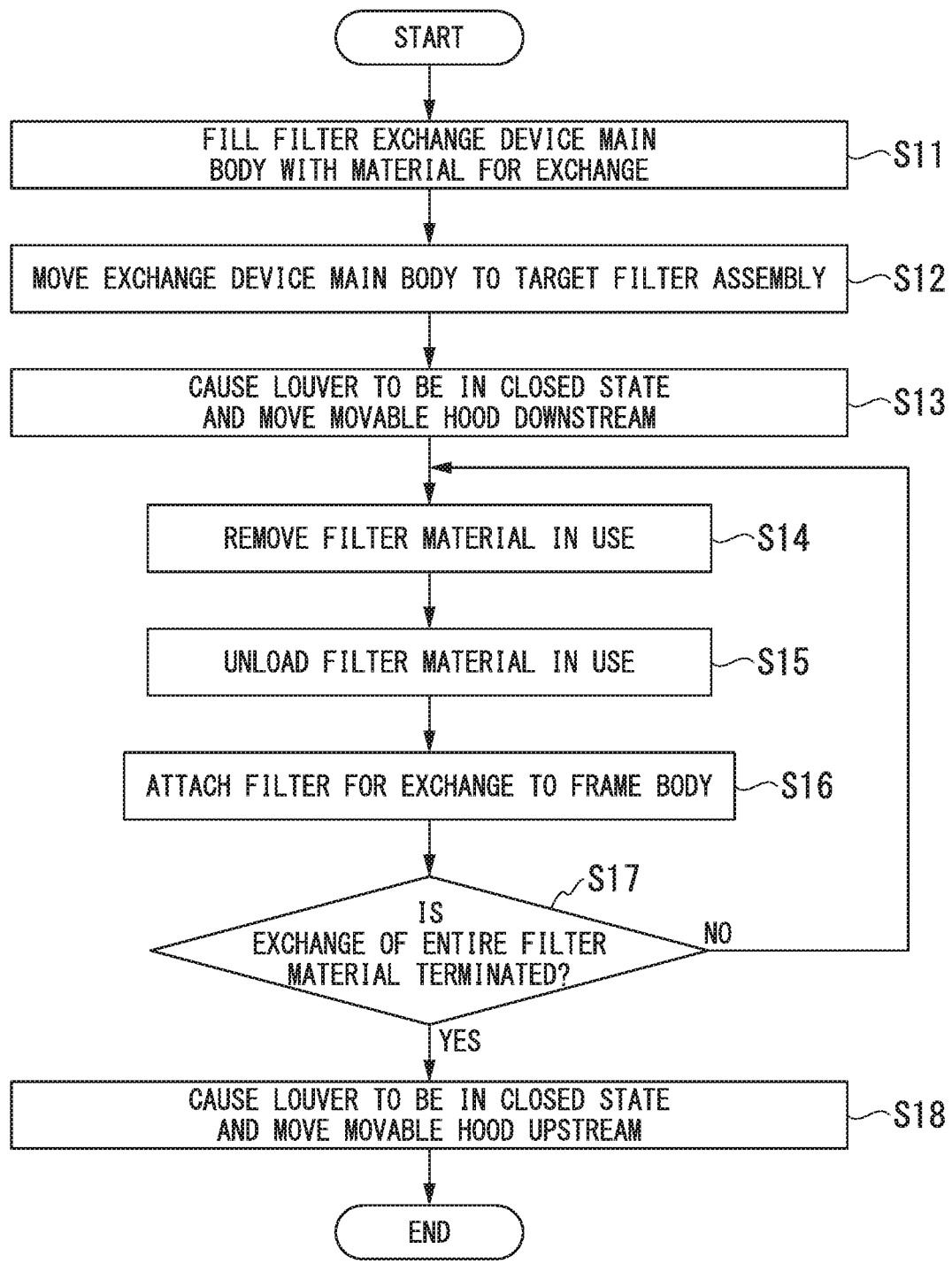
FIG. 10 is a flowchart for describing a control method of the filter exchange device of the first embodiment of the present invention.

As shown in FIG. 10, the control method of the filter exchange device 2 has a filling step S11 of filling the exchange device main body 19 with the filter materials 5 for exchange, an exchange device moving step S12 of moving the exchange device main body 19 to the filter assembly 4 of the exchange target, a blocking step S13 of closing the louver 28 and moving the movable hood 30 toward the filter assembly 4, a filter material removing step S14 of removing the used filter materials 5 using the exchange mechanism 29, a filter material unloading step S15 of unloading the used filter materials 5 using the filter material discharge mechanism 32 and the unloading conveyor 14, a filter material attaching step S16 of attaching the filter materials 5 for exchange to the frame body 10 using the exchange mechanism 29, a determination step S17 of determining whether exchange of all the filter materials 5 is terminated, and an opening step S18 of putting the louver 28 in an open state and moving the movable hood 30 toward the exchange device main body 19.

Before control of the filter exchange device 2, as shown in FIG. 8, a user attaches the filter materials 5 to the filter material holding frame 33. Next, the user houses the filter material holding frame 33, in which the filter materials 5 are held, into the housing 66 of the filter material filling device 16.

Figure 11:
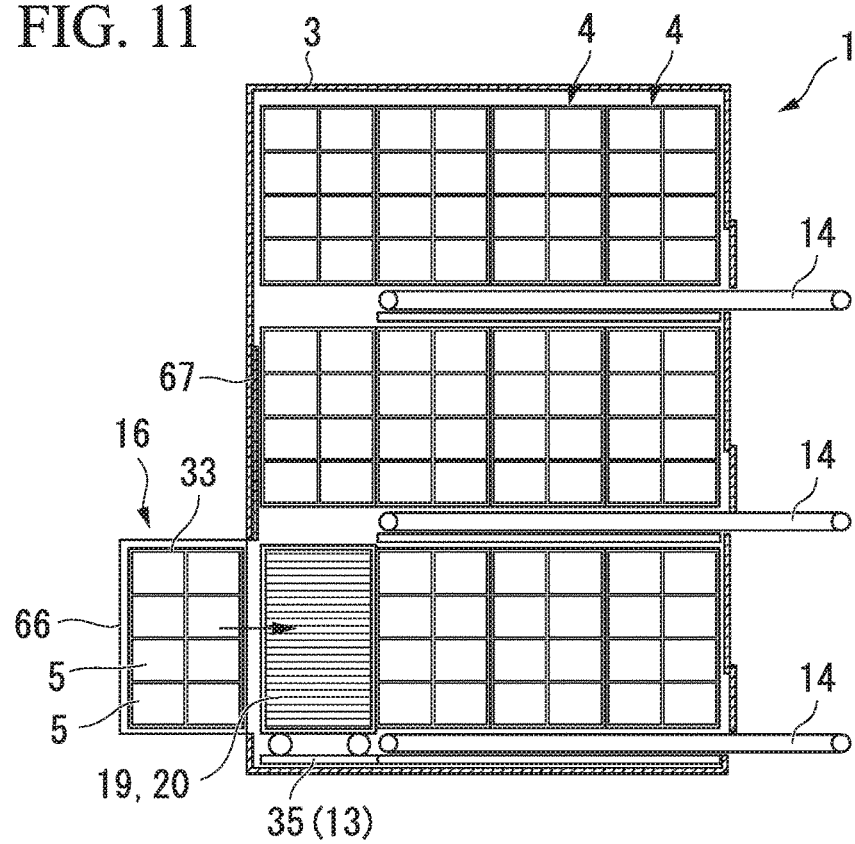
FIG. 11 is a view for describing a filling step of filling the exchange device main body with a filter material for exchange in the control method of the filter exchange device of the first embodiment of the present invention.

As shown in FIG. 11, in the filling step S11, the control device 20 mounted on the exchange device main body 19 moves the exchange device main body 19 onto the placing section 35 of the elevation mechanism 13, and moves the placing section 35 of the elevation mechanism 13 to the first story portion. That is, the exchange device main body 19 is placed adjacent to the housing 66 of the filter material filling device 16. Next, the control device 20 puts the isolation door 67 in an open state, and fills the exchange device main body 19 with the filter material holding frame 33 in which the filter materials 5 are held, using the conveyance device (not shown). Accordingly, the plurality of filter materials 5 for exchange are housed in the exchange device main body 19.

Figure 12:
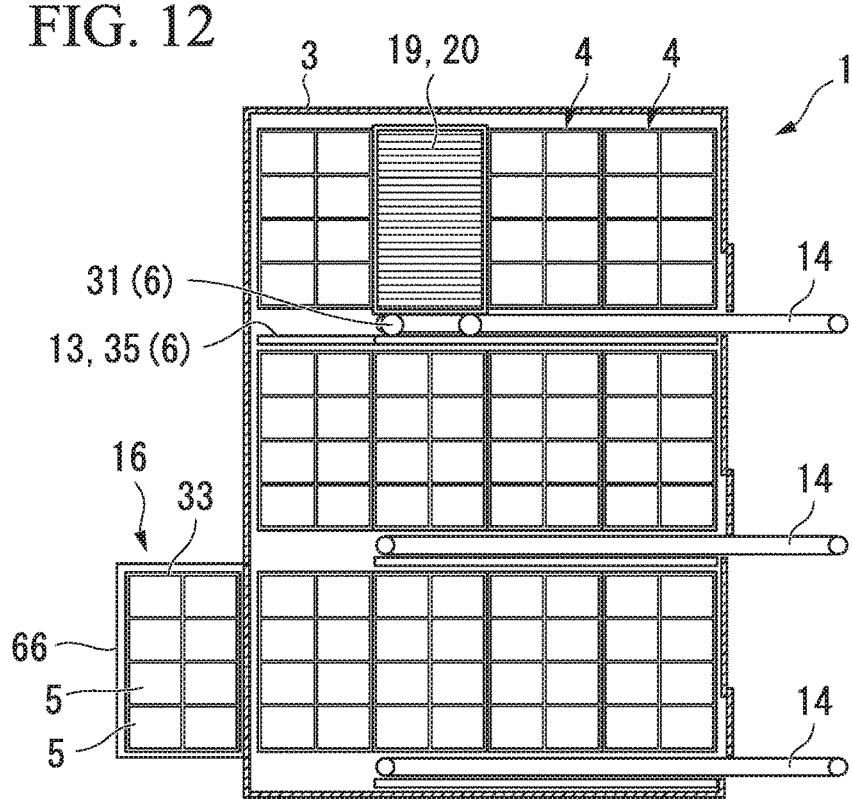
FIG. 12 is a view for describing an exchange device moving step of moving the exchange device main body to a filter assembly of an exchange target in the control method of the filter exchange device of the first embodiment of the present invention.

As shown in FIG. 12, in the exchange device moving step S12, the control device 20 moves the exchange device main body 19 to a position of a target filter assembly 4. When the target filter assembly 4 is in the third story portion, the elevation mechanism 13 is controlled to move the exchange device main body 19 to the third story portion. Next, the control device 20 controls the traveling mechanism 31 to move the exchange device main body 19 in the widthwise direction W and move the exchange device main body 19 to a desired portion. In this step, the louver 28 is in an open state. That is, a flow of the gas impeded by the exchange device main body 19 is suppressed to a minimum level.

Figure 13:
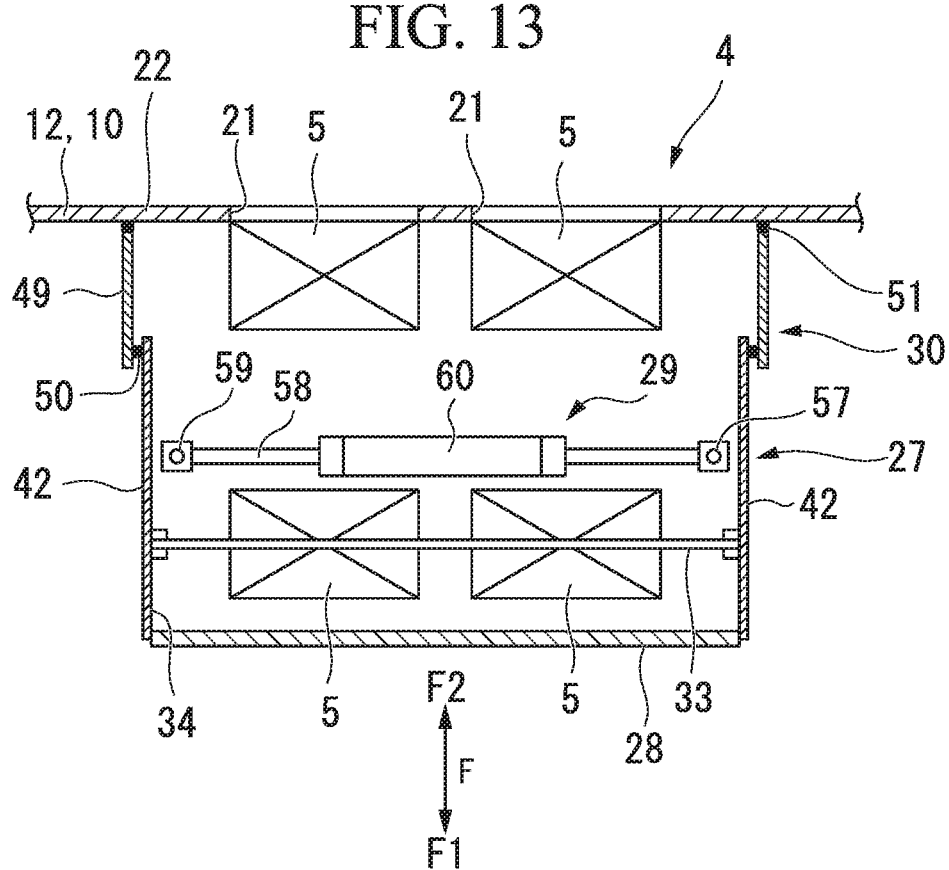
FIG. 13 is a view for describing an effect of a blocking step in the control method of the filter exchange device of the first embodiment of the present invention.

As shown in FIG. 13, in the blocking step S13, the control device 20 controls the electric motor of the louver 28 of the exchange device main body 19 to cause the plurality of vanes 44 of the louver 28 to be substantially vertical.

Accordingly, the louver 28 is closed. In addition, in the blocking step S13, the control device 20 controls the electric motor of the movable hood 30 to move the hood main body section 49 of the movable hood 30 toward the frame body 10 (the downstream side F2). The end portion at the downstream side F2 of the movable hood 30 is abutted to the frame body main body 22 of the frame body 10 according to movement of the hood main body section 49 of the movable hood 30 to the downstream side F2.

The gas flowing through the duct 3 does not flow to the filter materials 5 of the filter assembly 4 covered by the movable hood 30 because the movable hood 30 is abutted to the frame body 10 while the louver 28 is closed. That is, as shown in FIG. 13, the filter materials 5 of the filter assembly 4 are covered by the louver 28 in the closed state, the casing 27, and the movable hood 30.

In the filter material removing step S14, the control device 20 controls the exchange mechanism 29 to remove the used filter materials 5 held in the filter assembly 4.

Figure 14:
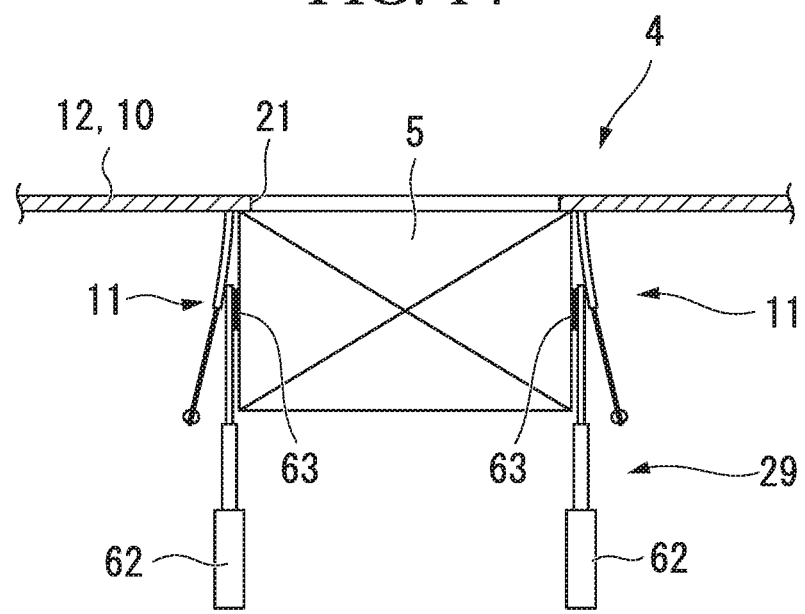
FIG. 14 is a view for describing a motion of a filter material removing step in the control method of the filter exchange device of the first embodiment of the present invention.

In the filter material removing step S14, the control device 20 moves the arms 62 of the exchange mechanism 29 to a front side of the filter material 5 to be removed. Next, the control device 20 pivots the pair of arms 62 such that a longitudinal direction of the arms 62 is horizontal. Next, as shown in FIG. 14, the control device 20 inserts the arms 62 between the filter material 5 and the fixing member 11. Accordingly, the used filter material 5 is gripped by the pair of arms 62. Next, the control device 20 contracts the pair of arms 62. Accordingly, the used filter material 5 is removed from the filter assembly 4. As the arms 62 are further contracted, the filter material 5 is dropped below the arms 62.

In the filter material unloading step S15, the control device 20 puts the filter material unloading door 46 in the open state, and unloads the used filter materials 5 to the outside of the casing 27 using the filter material discharge mechanism 32. The filter materials 5 unloaded to the outside of the casing 27 are moved in the widthwise direction W by the unloading conveyor 14 and unloaded to the outside of the duct 3 via the filter chamber unloading door 15.

In the filter material attaching step S16, the control device 20 attaches the filter materials 5 for exchange held by the filter material holding frame 33 to the frame body 10 using the exchange mechanism 29.

In the filter material attaching step S16, the control device 20 moves the arms 62 of the exchange mechanism 29 to the front side of any one of the filter materials 5 for exchange attached to the filter material holding frame 33. Here, as shown in FIG. 13, the filter materials 5 for exchange are held in the filter material holding frame 33.

Next, the control device 20 pivots the pair of arms 62 such that the longitudinal direction of the arms 62 is horizontal. Next, the control device 20 inserts the pair of arms 62 between the filter material 5 and the elastic member 38. Accordingly, the filter material 5 for exchange is gripped by the pair of arms 62. Next, the control device 20 contracts the pair of arms 62. Accordingly, the filter material 5 for exchange is removed from the filter material holding frame 33.

Next, the control device 20 pivots the pair of arms 62 to move the filter material 5 for exchange toward the wall frame 12. Further, the control device 20 moves the arms 62 to move the filter material 5 for exchange to a front side of the filter material holding section 17 to which the filter material 5 is not attached.

Next, the control device 20 attaches the filter material 5 for exchange to the frame body 10 by extending the arms 62.

When exchange of all the filter materials 5 is terminated, the louver 28 is put in an open state, and the movable hood 30 is moved to the upstream side F1.

Exchange of the filter materials 5 in all of the filter assemblies 4 installed at the duct 3 may be performed, or exchange of the filter materials 5 with respect to only the specified filter assembly 4 may be performed.

According to the embodiment, even when exchange of the filter materials 5 is performed while a gas flows through the duct 3, foreign substances can be suppressed from passing through the filter device 1. In addition, as the control device 20 controls the moving device 6 and the exchange mechanism 29, the filter materials 5 can be automatically exchanged. Accordingly, exchange of the filter materials 5 can be conveniently performed.

In addition, when exchange of the filter materials 5 is performed during an operation of the filter device 1, the foreign substances can be suppressed from passing through the filter device 1 by extending the movable hood 30 while putting the louver 28 in a closed state. In addition, when the exchange is not performed, as the louver 28 is put in an open state, passage of the gas through the casing 27 can be allowed.

In addition, as the filter exchange device 2 has the moving device 6 configured to move the exchange device main body 19, the exchange device main body 19 can be moved inside the duct 3.

As the moving device 6 has the tires 56 and the wheel driving device 55 installed at the exchange device main body 19, even when the plurality of filter materials 5 are installed in a horizontal direction, the plurality of filter materials 5 can be exchanged.

As the moving device 6 has the placing section 35 configured to support the exchange device main body 19 and the placing section driving device 64 configured to move the placing section 35 in the upward-downward direction, even when the plurality of stories are provided in the duct 3, the filter materials 5 on all of the stories can be exchanged.

In addition, as the unloading conveyor 14 is installed at the duct 3 while the filter material discharge mechanism 32 is installed at the exchange device main body 19, the removed filter materials 5 can be rapidly unloaded to the outside of the duct 3.

Second Embodiment

Hereinafter, a filter device 1B having a filter exchange device 2B of a second embodiment of the present invention will be described with reference to the accompanying drawings. Further, in the embodiment, differences from the above-described first embodiment will be mainly described and description of the same parts will be omitted.

The filter exchange device 2B of the embodiment fixes the plurality of filter materials 5 to a filter material frame 69 (see FIG. 16) and exchanges each of the filter material frames 69 (hereinafter referred to as a filter material unit 68) to which the plurality of filter materials 5 are fixed, in contrast to the filter exchange device 2 of the first embodiment that exchanges each filter material 5 when exchanging the filter materials 5.

In addition, in the filter exchange device 2B of the embodiment, the exchange device main body 19 is movable to the outside of the duct 3. Since the filter exchange device 2 is disposed outside the duct 3 except for during exchange of the filter materials 5, the louver 28 configured to allow passage of the gas during normal operation is unnecessary.

In addition, the filter exchange device 2B of the embodiment also has a function of conveying the used filter materials 5 (the used filter material unit 68) to the outside of the duct 3 in a state in which the filter materials 5 are accommodated in the casing 27 of the exchange device main body 19.

Figure 15:
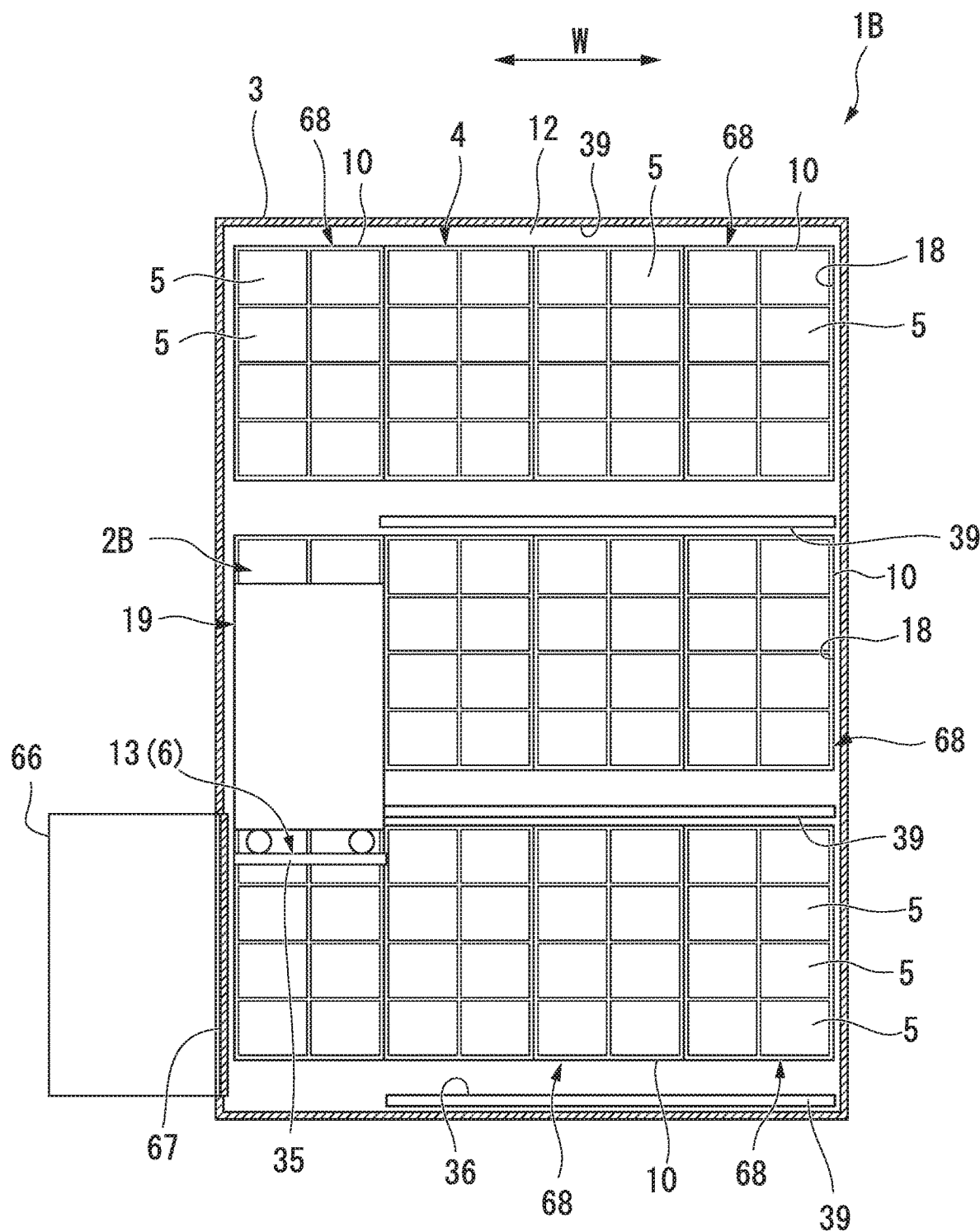
FIG. 15 is a front view of a filter device and a filter exchange device of a second embodiment of the present invention.

As shown in FIG. 15, the filter device 1B of the embodiment has the duct 3 configured to form a rectangular suction flow path, the wall frame 12 serving as a plate-shaped member installed in the duct 3 and perpendicular to the flow direction F, and the plurality of filter material units 68 attached to the wall frame 12.

The filter exchange device 2 of the embodiment does not have the unloading conveyor 14. That is, the unloading conveyor 14 is not installed at the duct 3. In addition, the filter chamber unloading door 15 is not installed at the duct 3.

Figure 16:
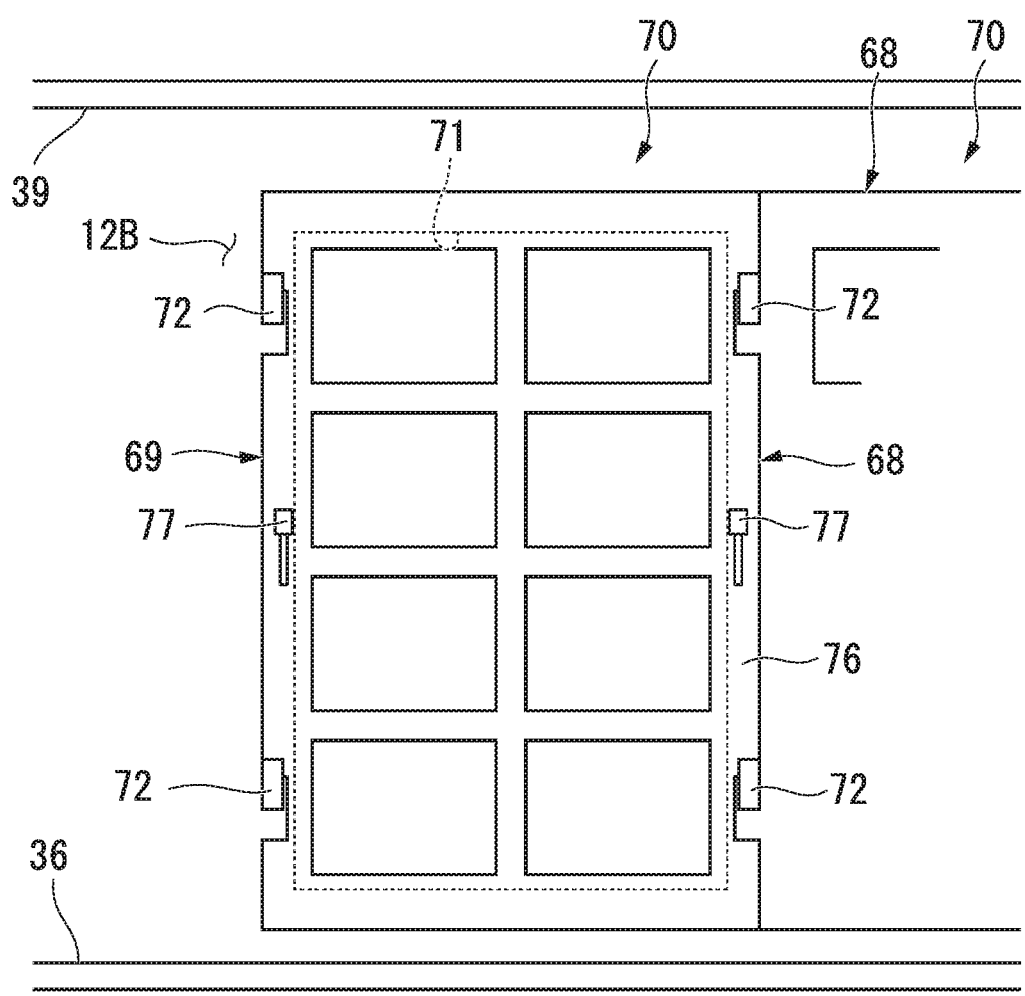
FIG. 16 is a front view showing a state in which a filter material unit of the second embodiment of the present invention is hooked by fixing hooks.

As shown in FIG. 16, a plurality of unit attachment sections 70 configured to attach the filter material unit 68 thereto are provided in the wall frame 12 of the embodiment. The unit attachment section 70 has a wall frame through-hole 71 formed in a rectangular shape to correspond to the filter material unit 68, and a plurality of fixing hooks 72 formed in the vicinity of the wall frame through-hole 71. The filter material unit 68 is attached to the wall frame 12 via the fixing hooks 72.

Figure 17:
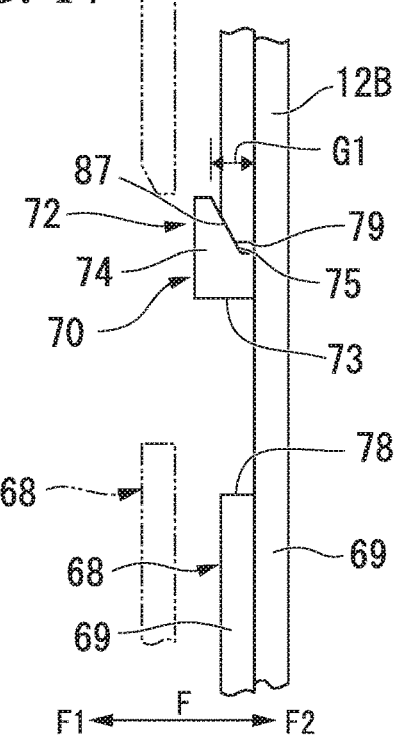
FIG. 17 is a cross-sectional view showing the state in which the filter material unit of the second embodiment of the present invention is hooked by the fixing hooks.

As shown in FIG. 17, the fixing hooks 72 are members installed on the wall frame 12 and protruding to the upstream side F1 in the flow direction. Each of the fixing hooks 72 has a base section 73 protruding to the upstream side F1 in the flow direction, and a hook main body 74 protruding upward from the end portion at the upstream side F1 of the base section 73. A first inclined surface 75 gradually approaching the wall frame 12 downward is formed at a side of the hook main body 74 facing the downstream side F2.

The fixing hooks 72 are formed such that an interval G1 between the upper end of the first inclined surface 75 and the wall frame 12 is larger than a plate thickness of the filter material frame 69 of the filter material unit 68.

Figure 18:
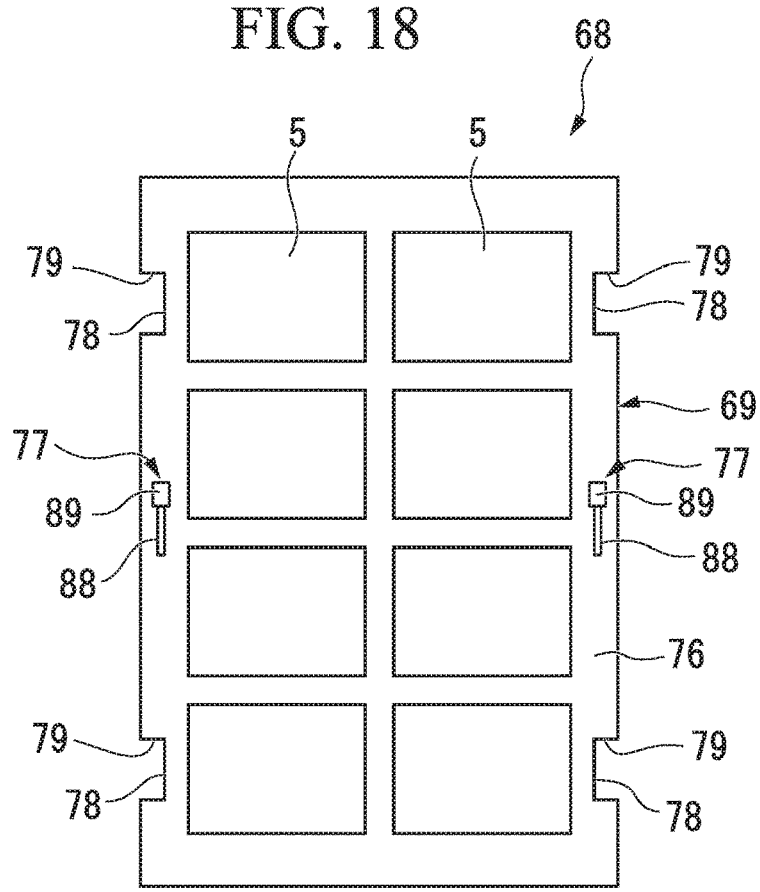
FIG. 18 is a front view of the filter material unit of the second embodiment of the present invention.

As shown in FIG. 18, the filter material unit 68 has the filter material frame 69 and the plurality of filter materials 5 fixed to the filter material frame 69. The filter material unit 68 is attached to the unit attachment section 70 of the wall frame 12 of the duct 3.

The filter material frame 69 has a frame main body 76 having a plate shape, and a pair of handle sections 77 fixed to the frame main body 76. The handle sections 77 are members used for conveying the filter material unit 68. The plurality of filter materials 5 are fixed to the surface of the frame main body 76 facing the upstream side F1.

The filter material frame 69 is configured to fix the four filter materials 5 in the upward-downward direction and fix the two filter materials 5 in the widthwise direction W crossing the upward-downward direction.

The filter materials 5 are fixed to the frame 37 by, for example, fixing screws. Further, the number of the above-mentioned filter materials 5 is merely an example, and is not limited to this number.

Rectangular through-holes (not shown) corresponding to the filter materials 5 fixed to the filter material frame 69 are formed in the frame main body 76. Four engaging sections 78 are formed in the frame main body 76. Two of the engaging sections 78 are formed at each side of the frame main body 76. The engaging sections 78 each have a rectangular shape, one side of which is connected to a side of the frame 37. The engaging section 78 has a supported side 79 supported by the fixing hook 72.

As shown in FIG. 17, the supported side 79 has a second inclined surface 87 to provide a cross-sectional shape in which a plate thickness is gradually increased upward. The second inclined surface 87 is formed at the upstream side F1 in the flow direction. That is, the second inclined surface 87 is formed at the side to which the filter materials 5 are fixed. The second inclined surface 87 has a shape corresponding to the first inclined surface 75 of the fixing hook 72 fixed to the wall frame 12.

The filter material unit 68 is attached to the wall frame 12 as the engaging sections 78 of the filter material unit 68 side are engaged with the fixing hooks 72. Here, the first inclined surface 75 and the second inclined surface 87 come in surface contact with each other. In addition, as the filter material unit 68 is slid to the downstream side F2 along the first inclined surface 75, the surface of the filter material unit 68 facing the downstream side F2 is abutted to the wall frame 12.

The pair of handle sections 77 are fixed to substantially a center in the upward-downward direction of the surface of the frame main body 76 facing the upstream side F1, at both sides in a horizontal direction of the frame main body 76. The pair of handle sections 77 are fixed to the upstream side F1 in the flow direction. The handle section 77 has a rod-shaped handle main body 88 protruding downward, and a handle connecting section 89 configured to connect the handle main body 88 and the frame main body 76.

Figure 19:
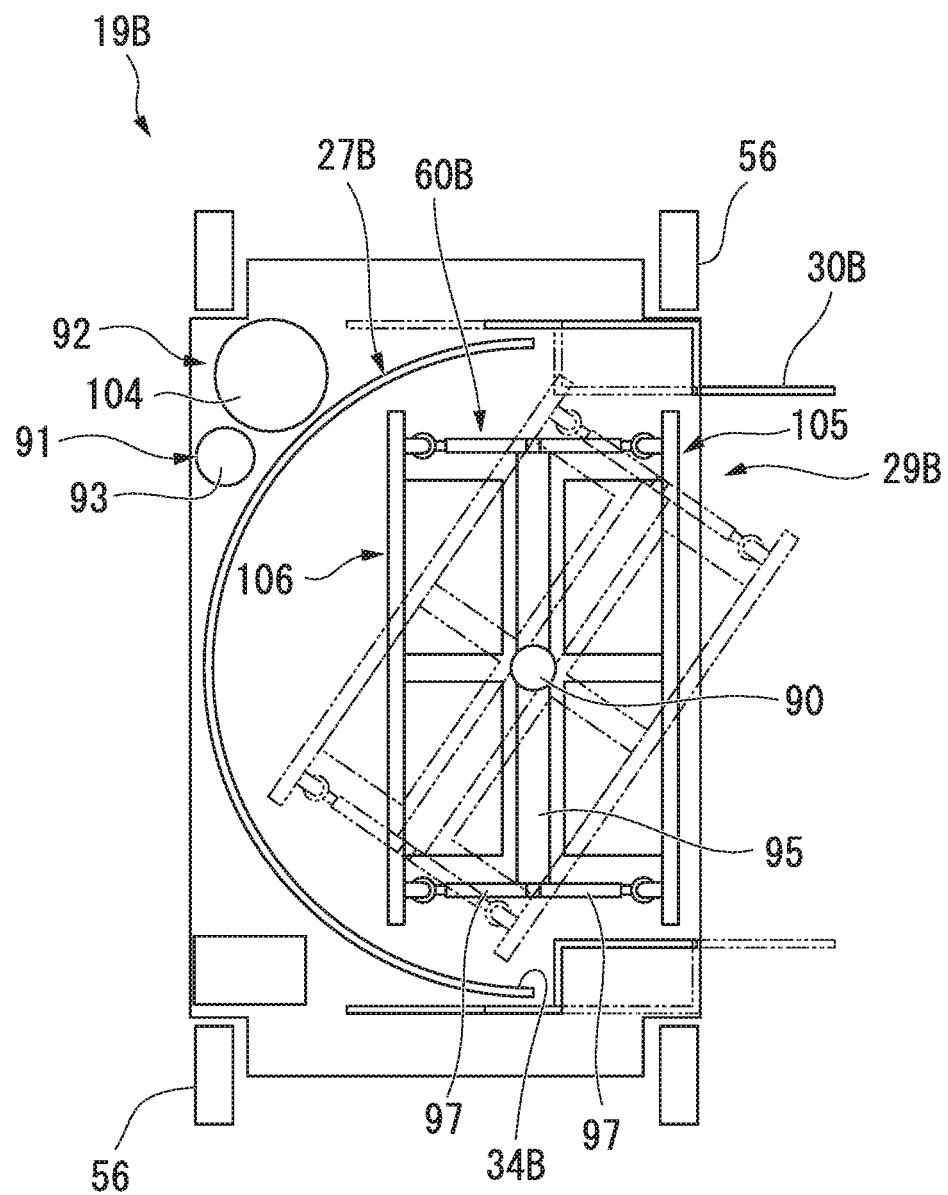
FIG. 19 is a plan view of an exchange device main body of the filter exchange device of the second embodiment of the present invention.
Figure 20:
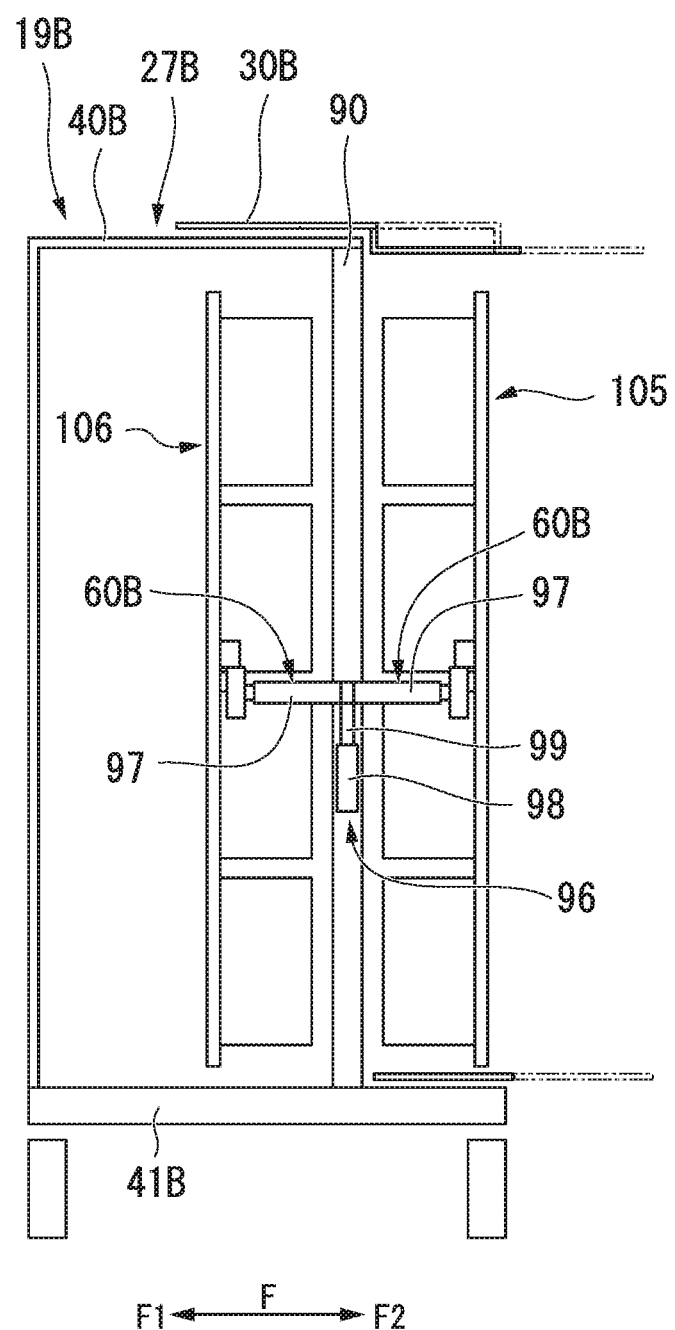
FIG. 20 is a side view showing a partial cross section of the exchange device main body of the filter exchange device of the second embodiment of the present invention.

As shown in FIG. 19 and FIG. 20, the exchange device main body 19B has a casing 27B and an exchange mechanism 29B. The casing 27B has a box shape in which the side facing the downstream side F2 in the flow direction is an opening section 34B. The louver 28 is not installed at the exchange device main body 19B of the embodiment.

The exchange mechanism 29B has a rotary shaft 90 installed at the casing 27B, a rotary shaft driving device 91 configured to rotatably drive the rotary shaft 90, a first mounting section 105 and a second mounting section 106 installed at positions symmetrical with respect to the rotary shaft 90, and arms 62 installed at the first mounting section 105 and the second mounting section 106.

The exchange mechanism 29B conveys the filter material unit 68 via the handle sections 77 installed on the filter material frame 69. The exchange mechanism 29B has a pair of cylindrical members 101 configured to support the pair of handle sections 77 from below, and moves the filter material unit 68 by moving the pair of cylindrical members 101 inside the casing 27B.

The rotary shaft 90 is a shaft-shaped member disposed at substantially a center of the casing 27B when seen in a plan view and extending in the upward-downward direction. The rotary shaft 90 is connected to an upper wall section 40B and a lower wall section 41B of the casing 27B via bearings (not shown). The rotary shaft 90 is rotatably driven about an axis thereof by a driving force of the rotary shaft driving device 91. The rotary shaft driving device 91 has an electric motor 93 for a rotary shaft, and a transmission mechanism (not shown) configured to transmit a driving force of the output shaft of the electric motor 93 for a rotary shaft to the rotary shaft 90.

One of the used filter material unit 68 and the filter material unit 68 for exchange is mounted on the first mounting section 105. The other one of the used filter material unit 68 and the filter material unit 68 for exchange is mounted on the second mounting section 106.

The first mounting section 105 has arms 60B configured to remove the filter material unit 68 attached to the duct 3 and attach the filter material unit 68 accommodated in the casing 27B to the duct 3.

The arms 60B are connected to the rotary shaft 90 via a connecting beam 95. The arms 60B are rotated about the axis of the rotary shaft 90 according to rotation of the rotary shaft 90. The connecting beam 95 is installed at substantially a center in the upward-downward direction of the rotary shaft 90, and extends in one direction perpendicular to the rotary shaft 90 and the other direction opposite to the one direction.

The arms 60B have arm elevation mechanisms 96 installed at both ends of the connecting beam 95, and a pair of telescopic arms 97 attached to the arm elevation mechanisms 96.

The pair of arm elevation mechanisms 96 are mechanisms configured to move the telescopic arms 97 in the upward-downward direction, and may be constituted by, for example, a pneumatic cylinder. The arm elevation mechanism 96 has a cylinder section 98 having a tubular shape, and a rod section 99 driven pneumatically. The cylinder section 98 is fixed to the distal end of the connecting beam 95 such that an axis of the cylinder section 98 is disposed in the upward-downward direction and the rod section 99 is disposed thereabove.

Figure 21:
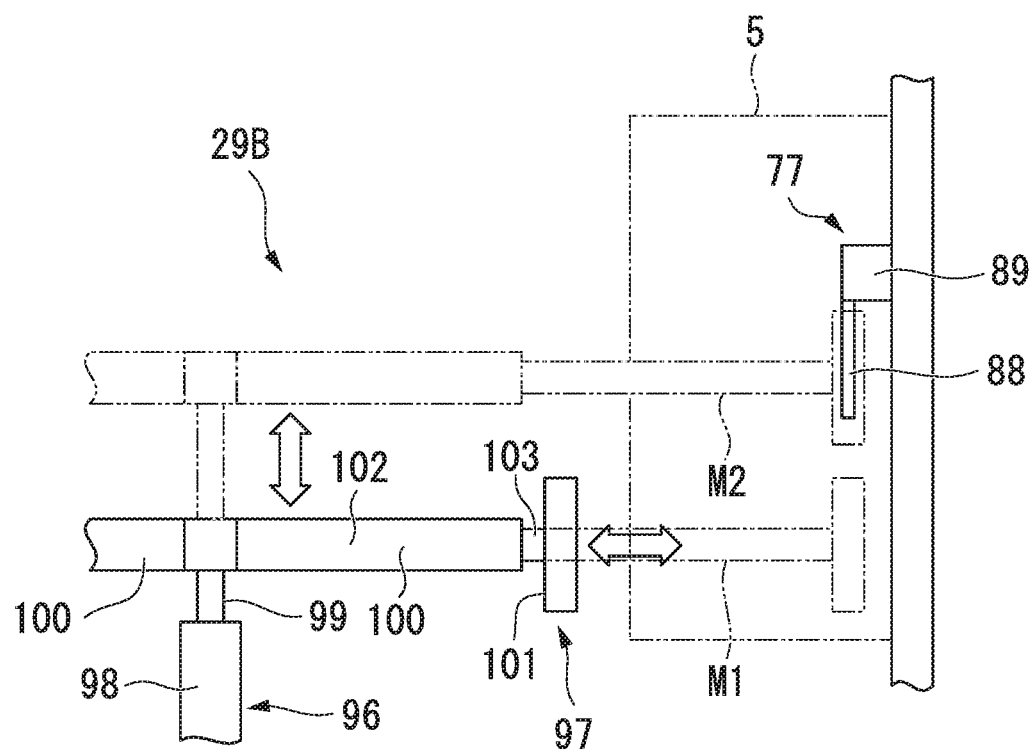
FIG. 21 is a view for describing a motion of a filter material removing step in a control method of the filter exchange device of the second embodiment of the present invention.

As shown in FIG. 21, the telescopic arm 97 has a telescopic arm main body 100 attached to a distal end of the rod section 99 of the arm elevation mechanism 96, and the cylindrical member 101 attached to the telescopic arm main body 100. The telescopic arm main body 100 may be constituted by, for example, a pneumatic cylinder. The telescopic arm main body 100 has a second cylinder section 102 having a tubular shape, and a second rod section 103 driven pneumatically. The end portion of the second cylinder section 102 opposite to the second rod section 103 is fixed to the end portion (upper end) of the rod section 99 of the arm elevation mechanism 96. The telescopic arm main body 100 extends in a horizontal direction and is fixed to the arm elevation mechanism 96 to extend in a direction perpendicular to the connecting beam 95.

The pair of telescopic arms 97 are disposed on the same straight line and fixed to the arm elevation mechanism 96 to butt against the cylinder section 98.

The cylindrical member 101 has a cylindrical shape and is fixed to the distal end of the rod section 99 of the telescopic arm 97 such that a central axis extends in the upward-downward direction.

An arm driving device 92 can employ, for example, an air tank 104 configured to supply compressed air into a pneumatic cylinder.

Next, a control method of the filter exchange device 2B of the embodiment will be described.

Figure 22:
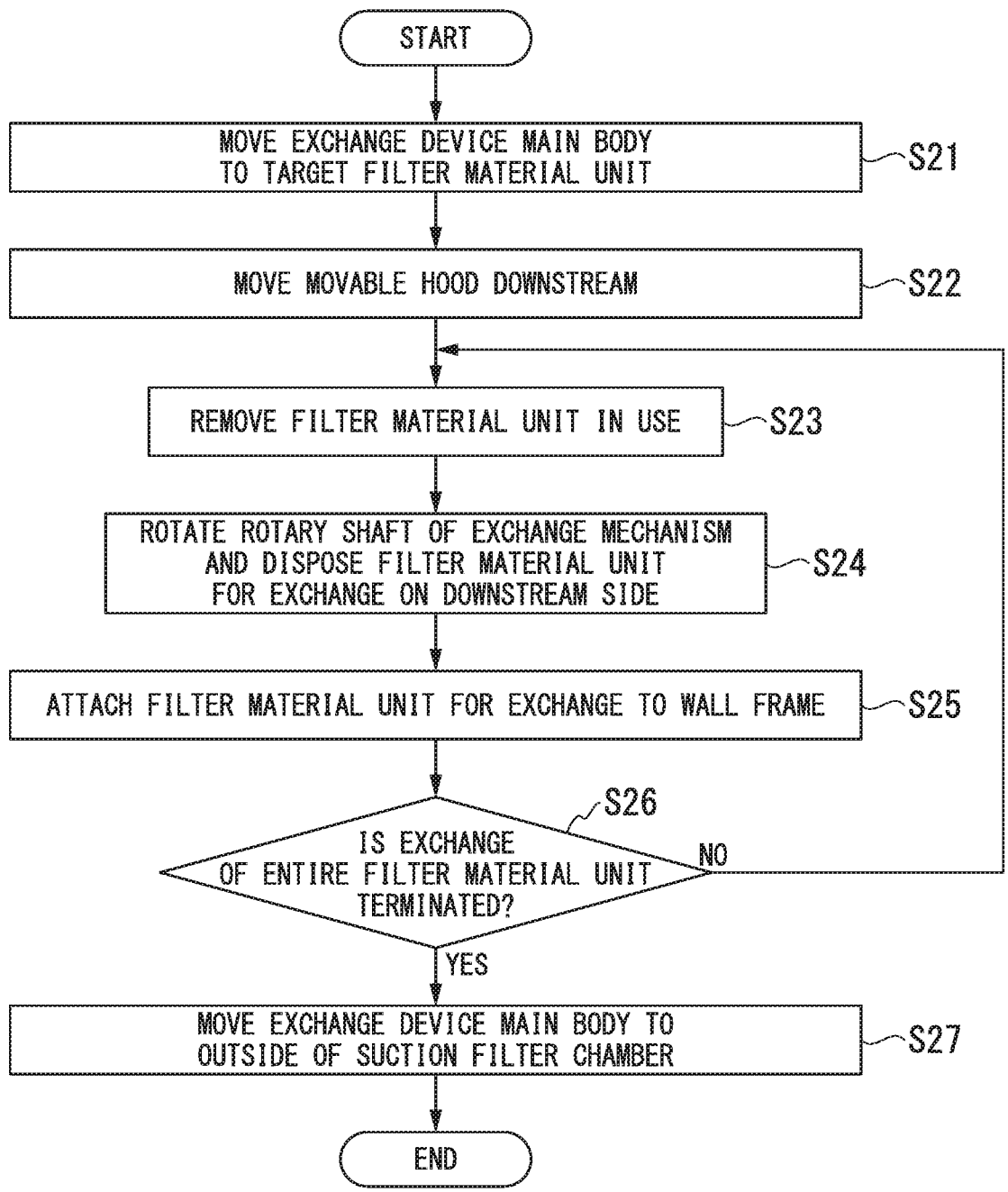
FIG. 22 is a flowchart for describing the control method of the filter exchange device of the second embodiment of the present invention.

As shown in FIG. 22, the control method of the filter exchange device 2B has an exchange device moving step S21 of moving the exchange device main body 19B to a target filter material unit 68, a blocking step S22 of moving the movable hood 30 to the downstream side F2, a filter material removing step S23 of removing the used filter material unit 68, a replacing step S24 of rotating the rotary shaft 90 of the exchange mechanism 29B and disposing the filter material unit 68 for exchange at the downstream side F2, an attaching step S25 of attaching the filter material unit 68 for exchange to the wall frame 12, and an exchange device withdrawing step S27 of moving the exchange device main body 19B to the outside of the duct 3.

In the filter exchange device 2B of the embodiment, during an operation of the gas turbine 80, the exchange device main body 19B is disposed outside the duct 3. That is, during the operation of the gas turbine 80, the exchange device main body 19B is disposed in the housing 66 disposed outside the duct 3.

Before control of the filter exchange device 2B, a user houses the filter material unit 68, to which the filter materials 5 for exchange are fixed, into the exchange device main body 19B disposed in the housing 66. The filter material unit 68 for exchange is attached to the arms 62 at the upstream side F1.

In the exchange device moving step S21, the control device 20 moves the exchange device main body 19B to a position of the target used filter material unit 68 by controlling the moving device 6.

Figure 23:
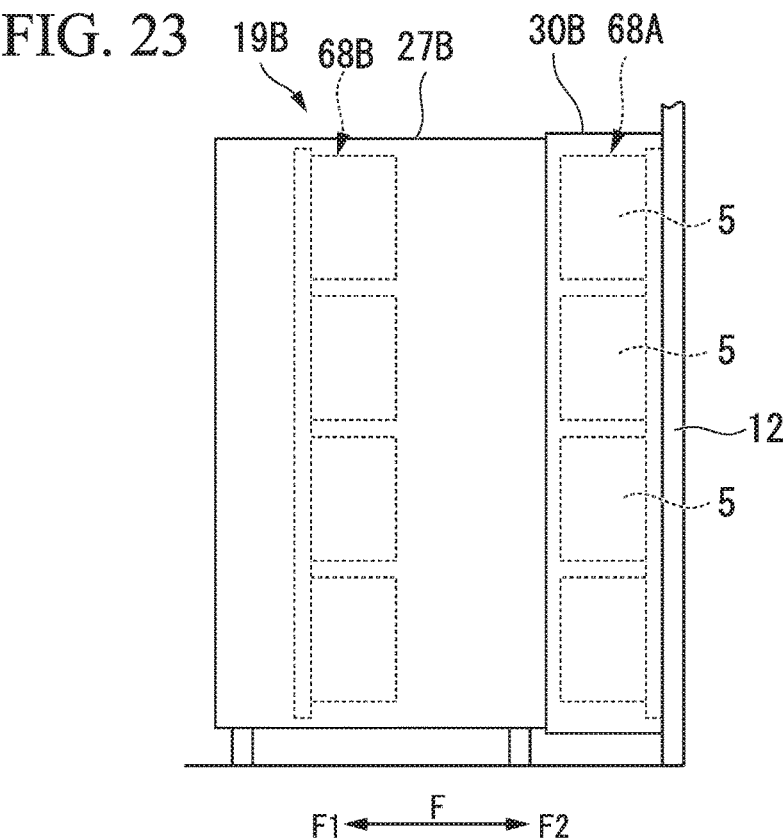
FIG. 23 is a view for describing a motion of a blocking step in the control method of the filter exchange device of the second embodiment of the present invention.

As shown in FIG. 23, in the blocking step S22, the control device 20 controls the electric motor of the movable hood 30B to move the movable hood 30B toward the wall frame 12 (the downstream side F2). As the movable hood 30B is abutted to the filter material frame 69, the gas flowing through the duct 3 does not flow to the filter materials 5 of the filter material unit 68 covered by the movable hood 30B.

In the filter material removing step S23, the control device 20 controls the telescopic arms 97 of the exchange mechanism 29B to extend the telescopic arms 97 toward the wall frame 12 as shown by reference character M1 of FIG. 21.

Here, the telescopic arms 97 move until a central axis of the cylindrical member 101 coincides with a central axis of the handle main body 88 of the handle section 77. Next, the control device 20 controls the arm elevation mechanisms 96 to move the telescopic arms 97 upward as shown by reference character M2 of FIG. 21. Accordingly, the cylindrical members 101 of the telescopic arms 97 hold the handle main bodies 88 of the handle sections 77. The filter material unit 68 is removed by further moving the telescopic arms 97 upward.

Figure 24:
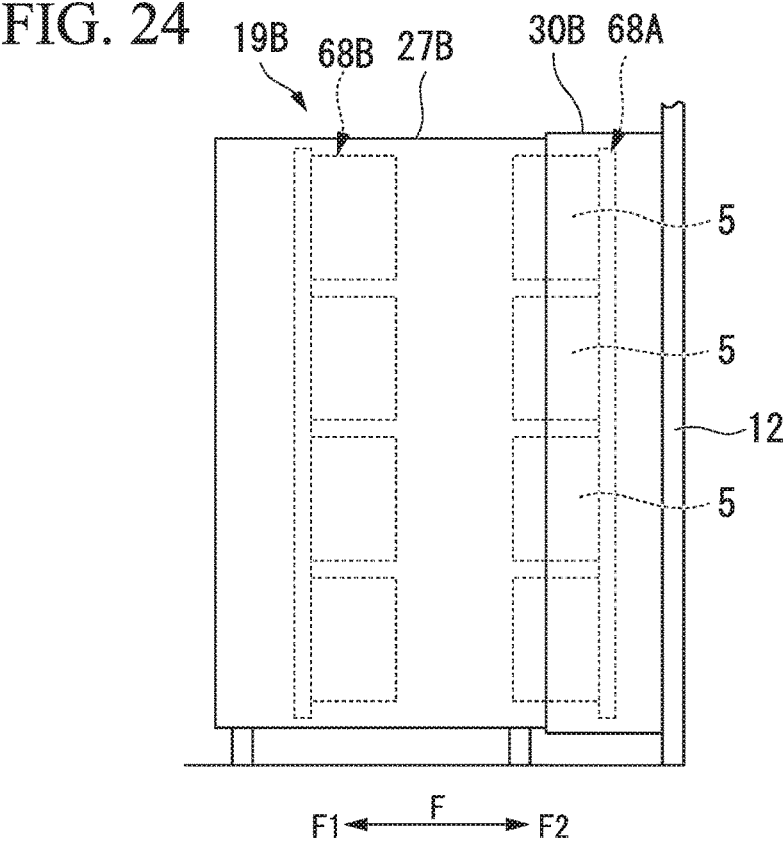
FIG. 24 is a view for describing a motion of a filter material removing step in the control method of the filter exchange device of the second embodiment of the present invention.

Next, as shown in FIG. 24, the control device 20 controls the telescopic arms 97 to pull the used filter material unit 68 to the upstream side F1.

As shown in FIG. 19, in the replacing step S24, the control device 20 rotates the rotary shaft 90 to rotate the exchange mechanism 29B. Accordingly, in the casing 27B, the used filter material unit 68 is disposed at the upstream side F1 and the filter material unit 68 for exchange is disposed at the downstream side F2.

In the attaching step S25, the control device 20 attaches the filter material unit 68 for exchange to the wall frame 12 in a reverse operation to the filter material removing step S23. That is, as the telescopic arms 97 holding the filter material unit 68 for exchange are extended toward the wall frame 12, the filter material unit 68 for exchange is moved toward the wall frame 12.

Next, as the telescopic arms 97 are moved downward, the filter material unit 68 is hooked by the fixing hooks 72.

In the exchange device withdrawing step S27, the control device 20 moves the exchange device main body 19B to the housing 66 outside the duct 3 by controlling the moving device 6.

According to the embodiment, the filter materials 5 can be exchanged more quickly by providing the configuration for gripping the plurality of filter materials 5 together.

In addition, as the exchange mechanism 29B has the configuration in which the first mounting section 105 and the second mounting section 106 are provided and the filter material units 68 mounted thereon are replaced, the filter materials 5 can be exchanged more quickly.

In addition, as the fixing hooks 72 have the first inclined surface 75 formed to be lowered while approaching the wall frame 12 and the filter material unit 68 slides along the first inclined surface 75, the filter material unit 68 can be automatically abutted to the wall frame 12.

In addition, since the unloading conveyor 14 installed at the duct 3 is unnecessary, the filter exchange device of the second embodiment can be introduced at a lower cost than the filter exchange device 2 of the first embodiment.

While embodiments of the present invention have been described above in detail, various modifications may be made without departing from the technical spirit of the present invention.

For example, instead of the louver 28 installed at the exchange device main body 19 of the filter exchange device 2 of the first embodiment, a configuration may be provided in which a wall section configured to close the opening sections 34 at the upstream side F1 of the casing 27 is provided and the exchange device main body 19 is moved to the outside of the duct 3.

In addition, the louver may be installed at the exchange device main body 19B of the filter exchange device 2B of the second embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A filter exchange device attached to a holding frame disposed in a duct and configured to exchange a plurality of filter materials configured to filter a gas flowing through the duct in a filter device, the filter exchange device being capable of exchanging the plurality of filter materials during operation of the filter device, the filter exchange device comprising:
   an exchange device main body;
   a moving device which is a mechanism configured to move the exchange device main body in at least one of a widthwise direction and an upward-downward direction of the duct, and is configured to move the exchange device main body to an upstream side of the holding frame disposed in the duct; and
   a control device configured to control the exchange device main body and the moving device so as to move the exchange device main body to a position of a used filter material of an exchange target,
   wherein the exchange device main body has:
   a casing in which an accommodating space is formed;
   an exchange mechanism configured to remove the used filter material attached to the holding frame and attach a filter material accommodated in the casing, for exchange; and
   a blocking unit configured to block the gas passing through a portion of the holding frame to which the used filter material is attached,
   wherein the blocking unit has a movable hood, which is provided to extend and contract on the downstream side of the casing, the movable hood being movable between a sealing position at which the movable hood comes in contact with the holding frame and closes a gap between the casing and the holding frame, and a separated positon separated from the holding frame.

2. The filter exchange device according to claim 1, wherein the casing has an opening section configured to bring the accommodating space in communication with the outside, and
   the blocking unit has a louver configured to block the opening section.

3. The filter exchange device according to claim 1, wherein the exchange mechanism has:
   an arm configured to grip the filter material; and
   an arm moving mechanism configured to move the arm.

4. The filter exchange device according to claim 1, comprising:
   a filter material discharge mechanism configured to discharge a used filter material removed by the exchange mechanism from the casing; and
   a conveyor configured to unload the used filter material, discharged from the casing by the filter material discharge mechanism, to the outside of the duct.

5. The filter exchange device according to claim 1, wherein the plurality of filter materials are attached to the holding frame as a plurality of filter material units in each of which a plurality of the filter materials are fixed to a filter material frame having a plate shape,
   the casing is able to accommodate the filter material unit to which the used filter material is fixed and the filter material unit to which the filter material for exchange is fixed,
   the exchange mechanism has:
   a rotary shaft installed at the casing;
   a rotary shaft driving device configured to rotatably drive the rotary shaft;
   a first mounting section and a second mounting section installed at positions symmetrical with respect to the rotary shaft, the first mounting section being a section on which one of the used filter material unit and the filter material unit for exchange is mounted, the second mounting section being a section on which the other one of the used filter material unit and the filter material unit for exchange is mounted; and
   arms installed at the first mounting section and the second mounting section, and configured to remove the filter material unit attached to the duct and attach the filter material unit accommodated in the casing to the duct, and
   the first mounting section and the second mounting section are configured to exchange positions according to rotation of the rotary shaft.

6. The filter exchange device according to claim 5, wherein the filter material frame has an engaging section configured to be engaged with a fixing hook formed at the holding frame.

7. The filter exchange device according to claim 1, wherein the moving device has a traveling mechanism having wheels installed under the exchange device main body and a wheel driving device configured to drive the wheels.

8. The filter exchange device according to claim 7, wherein the moving device has a placing section configured to support the exchange device main body and a placing section driving device configured to move the placing section in an upward-downward direction.

9. A control method of the filter exchange device according to claim 1, the control method comprising:
   an exchange device moving step of controlling the moving device and moving the exchange device main body to a position of a filter material of an exchange target;
   a blocking step of controlling the blocking unit so as to block the gas flowing through the duct and thereby preventing the gas from passing through a portion of the holding frame to which the filter material is attached;
   a filter material removing step of controlling the exchange mechanism and removing the filter material; and
   a filter material attaching step of controlling the exchange mechanism and attaching a filter material for exchange to the holding frame.

10. Gas turbine equipment comprising:
a gas turbine including a suction duct;
a filter device installed at an upstream side of the suction duct; and
the filter exchange device according to claim 1.

* * * * *